US010078805B2

(12) United States Patent
Westlake

(10) Patent No.: US 10,078,805 B2
(45) Date of Patent: Sep. 18, 2018

(54) OPERATIONS MANAGEMENT SYSTEM AND RELATED METHODS

(71) Applicant: SightPlan, Inc., Orlando, FL (US)

(72) Inventor: Joseph S. Westlake, Orlando, FL (US)

(73) Assignee: SIGHTPLAN, INC., Orlando, FL (US)

( * ) Notice: Subject to any disclaimer, the term of this patent is extended or adjusted under 35 U.S.C. 154(b) by 895 days.

(21) Appl. No.: 14/488,895

(22) Filed: Sep. 17, 2014

(65) Prior Publication Data

US 2015/0081367 A1 Mar. 19, 2015

Related U.S. Application Data

(60) Provisional application No. 61/878,962, filed on Sep. 17, 2013.

(51) Int. Cl.
G06Q 10/00 (2012.01)
G06Q 10/06 (2012.01)
G06Q 10/08 (2012.01)
H04W 4/80 (2018.01)

(52) U.S. Cl.
CPC .......... G06Q 10/06311 (2013.01); G06Q 10/063114 (2013.01); G06Q 10/063116 (2013.01); G06Q 10/087 (2013.01); H04W 4/80 (2018.02)

(58) Field of Classification Search
CPC ............. H04W 4/80; G06Q 10/06311; G06Q 10/063114; G06Q 10/063116
USPC .................... 705/7.13, 7.15, 7.16
See application file for complete search history.

(56) References Cited

U.S. PATENT DOCUMENTS

| 8,229,962 | B1 * | 7/2012 | Cavalancia, II | G06Q 10/06311 707/706 |
| 2002/0062218 | A1 | 5/2002 | Pianin | |
| 2012/0095926 | A1 * | 4/2012 | Nishimura | G06Q 10/103 705/301 |
| 2014/0343980 | A1 * | 11/2014 | Majid | G06Q 10/20 705/7.12 |

OTHER PUBLICATIONS

Phair, Software on-Site, 106 Midwest Contractor 12 (Mar. 2006) (Year: 2006).*

(Continued)

Primary Examiner — Charles Guiliano
(74) Attorney, Agent, or Firm — Allen, Dyer, Doppelt + Gilchrist, P.A.

(57) ABSTRACT

An operations management server associated with a site location having a plurality of distributed assets therein may store a database(s) including a hierarchy of places within the site location, respective places for the plurality of assets within the site location, and pending work orders for respective assets and respective priority indicators associated therewith, determine a respective place associated with a given asset based upon a work order associated therewith and the database, determine a parent place within the site location within which the place associated with the given asset resides based upon the database, and determine at least one sibling place within the parent place based upon the database. The server may also determine pending work orders for other assets, determine a relative priority of the determined work orders, and communicate the determined work orders to a mobile communications device for completion in order of relative priority.

18 Claims, 23 Drawing Sheets

(56) References Cited

OTHER PUBLICATIONS

GeoJSON "GeoJSON is a format for encoding a variety of geographic data structures" 1 pg. Retrieved from internet on Sep. 9, 2014.
"Left-child right-sibling binary tree" http://en.wikipedia.org/wiki/left-child_right-sibling_binary_tree: 1 pg. Retrieved from internet on Sep. 9, 2014.

\* cited by examiner

OPERATIONS MANAGEMENT SYSTEM AND RELATED METHODS

CROSS-REFERENCE TO RELATED APPLICATIONS

This application claims the benefit of U.S. Provisional Application No. 61/878,692, filed Sep. 17, 2013, which is hereby incorporated herein in its entirety by reference.

TECHNICAL FIELD

The present disclosure generally relates to computer-based operations management systems, and, more particularly, to a computer-based system and related methods for managing on-site operations services for properties.

BACKGROUND

Asset tracking and maintenance is an important consideration of property management. Such assets may include items such as HVAC systems, lighting, plumbing, appliances, as well as other items in or around buildings that require maintenance, replacement, inventory tracking, etc. The challenges of tracking such assets and their repair or replacement schedule may become particularly acute as the size of the property under management increases, as well as the when the number of properties being managed increases.

Various approaches have been developed for providing property management services. One such example is set forth in U.S. Pat. Pub. No. 2002/0062218 to Pianin. This reference discloses an approach for managing commercial real estate property by providing access to multiple commercial real estate services using an on-line property management environment. The on-line property management environment comprises a distributed computer network, such as the global Internet, coupled to numerous clients, a property services server platform connected to a local database, and numerous property information databases. The on-line property management environment improves the efficiency and effectiveness of commercial real estate transactions by providing a Web site that can serve as a commercial real estate professional's workspace to obtain industry specific content, use support tools, benchmark performance, and access vendors in a personalized environment. The Web site can facilitate the offering of multiple services relating to the property management including site appraisal, engineering, and environmental services in an on-line computing environment such as the global Internet.

Despite the existence of such systems, further enhancements for tracking and maintaining distributed assets within one or more site locations may be desirable in many applications.

SUMMARY

An operations management system is for a site location having a plurality of assets distributed within the site location. The operations management system may include at least one mobile communications device configured to receive pending work orders to be completed for the assets, and an operations management server configured to store at least one database comprising a hierarchy of places within the site location, respective places associated with the plurality of assets within the site location, and pending work orders for respective assets and respective priority indicators associated therewith. The server may also be configured to determine a respective place associated with a given asset having a pending work order associated with the given asset based upon the at least one database, determine a parent place within the site location within which the place associated with the given asset resides based upon the at least one database, determine at least one sibling place within the parent place based upon the at least one database, and determine pending work orders for other assets within the place associated with the given asset and within the at least one sibling place. The server may further be configured to determine a relative priority of the determined work orders within the place associated with the given asset and within the at least one sibling place based upon their respective priority indicators, and communicate the determined work orders to the at least one mobile communications device for completion in order of their relative priority, and cooperate with the at least one mobile communications device to close pending work orders upon completion thereof in their order of relative priority.

More particularly, the operations management server may be further configured to perform a parent traversal operation to determine successive parent places within the hierarchy terminating at the site location, and perform a subtree traversal operation to determine place subtrees beneath the site location. As such, pending work orders for other assets within the determined place subtrees may also be determined.

The operations management system may further include a plurality of locator devices positioned throughout the site location and having respective identifiers associated therewith, and at least one other mobile communications device comprising at least one first sensor for determining identifiers from respective locator devices. The at least one other mobile communications device may be configured to generate work orders for assets based upon the at least one first sensor and locator devices adjacent respective assets. Moreover, the at least one mobile communications device may include at least one second sensor also configured to determine identifiers from respective locator devices, and the operations management server may be configured to cooperate with the at least one mobile communications device to close pending work orders upon completion thereof based upon the at least one second sensor and locator devices adjacent respective assets. By way of example, the locator devices may comprise at least one of a WiFi transceiver, a Bluetooth transceiver, a radio frequency identification (RFID) device, a near field communication (NFC) device, and a quick response (QR) code reader.

The assets may have respective asset types associated therewith, and each asset type may have respective tasks to be completed in a sequential order for work orders associated therewith. Moreover, the operations management server may be configured to cooperate with the at least one mobile communications device to close pending work orders upon completion of the tasks associated with the respective asset type in their sequential order. The operations management system of claim 1 wherein the assets have respective asset types associated therewith, and the operations management server may be further configured to provide a template to the at least one mobile communications device for closing the pending work orders that changes based upon the asset type of the asset associated with the work order.

A related operations management server and associated method for operating an operations management server are also provided. Furthermore, a non-transitory computer-readable medium may also be provided having computer-executable instructions for causing a server to perform the steps described further below.

DETAILED DESCRIPTION

The present description is made with reference to the accompanying drawings, in which exemplary embodiments are shown. However, many different embodiments may be used, and thus the description should not be construed as limited to the embodiments set forth herein. Rather, these embodiments are provided so that this disclosure will be thorough and complete.

Figure 1:
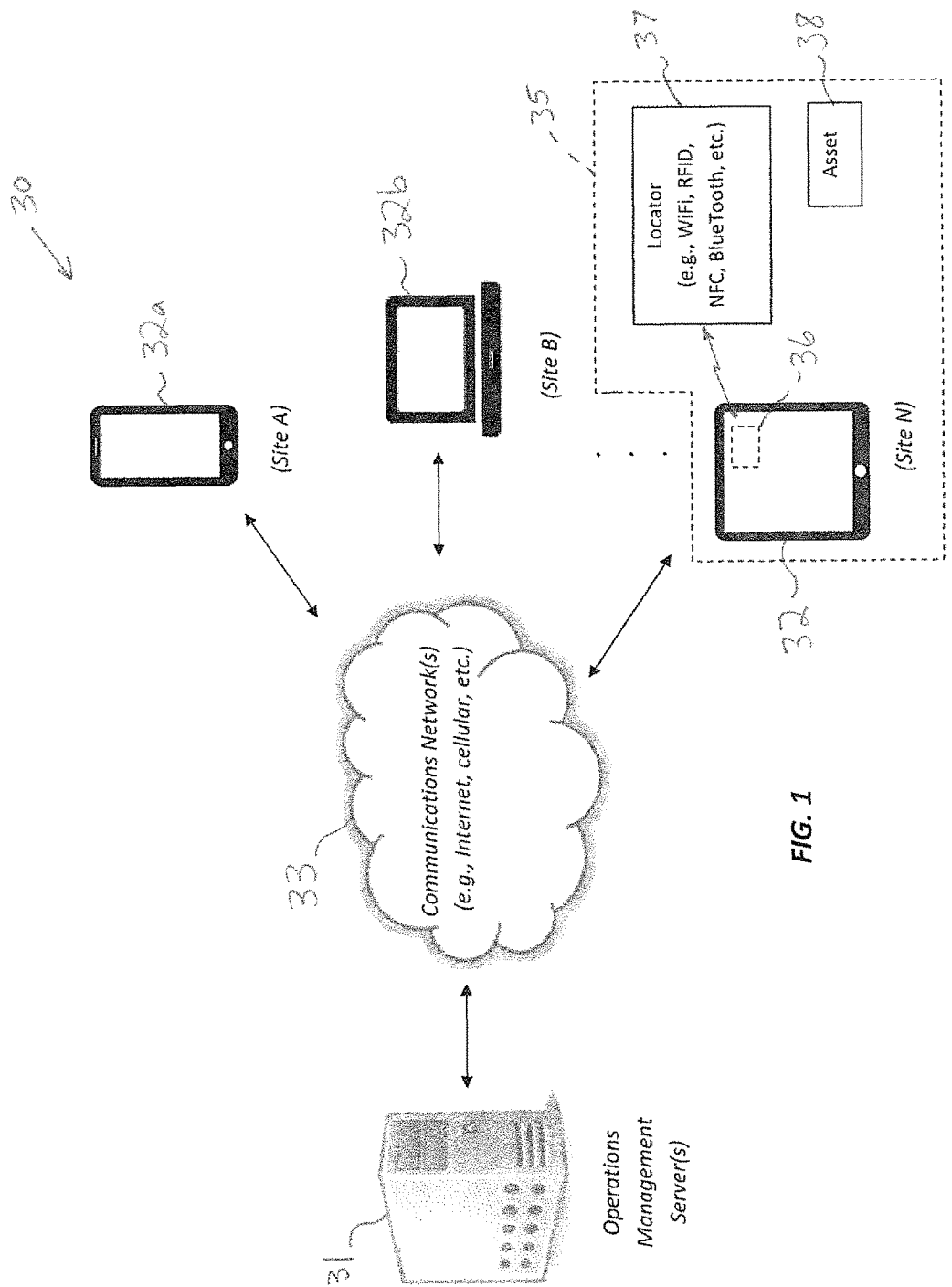
FIG. 1 is a schematic block diagram of a computer system which may be used for providing operations management features in accordance with an example embodiment.

Referring initially to FIG. 1, an operations management system 30 illustratively includes one or more operations management servers 31 that communicate with a plurality of different communications devices 32a-32n, such as mobile or smart phones, laptop computers, tablet computers, etc. Portable communications devices with wireless communication capabilities (e.g., cellular, Wi-Fi, etc.) may be particularly beneficial for certain users, such as maintenance workers, in that these may be carried with them to job sites to review or create tasks while in the field. In the example of FIG. 1, the mobile device 32n has a sensor 36 it uses to communicate with or read a locator device 37 to obtain identification and/or location information for an asset 38 in a building location (site N) within a site location 35, as will be discussed further below. However, other computing devices (e.g., desktop computers, etc.) may also be used to interface with the operations management server to perform the operations management functions set forth herein. By way of example, the various communications devices 32a-32n may communicate with the operations management server 31 via one or more communications networks 33, such as cellular or Wi-Fi networks and the Internet. Various operations management functions may be performed by the communications devices 32a-32n in cooperation with the operations management server 31, as will be discussed further below. However, it should be noted that in some instances, various operations may be performed by a given communications device 32a-32n without having access to the operations management server (e.g., in an off-line mode, etc.). The server 31 and communications devices 32a-32n may include appropriate hardware (e.g., processor, etc.) and non-transitory computer-readable mediums including computer-executable instructions for performing the various operations described herein. Moreover, the server(s) 31 may provide multi-tenant hosting, in that operations for a plurality of different properties may be hosted or managed by the server(s). By way of example, the system 30 may be used in a variety of operations management applications, including residential housing, military housing, student housing, commercial properties, community associations, municipal facilities, etc.

Figure 2:
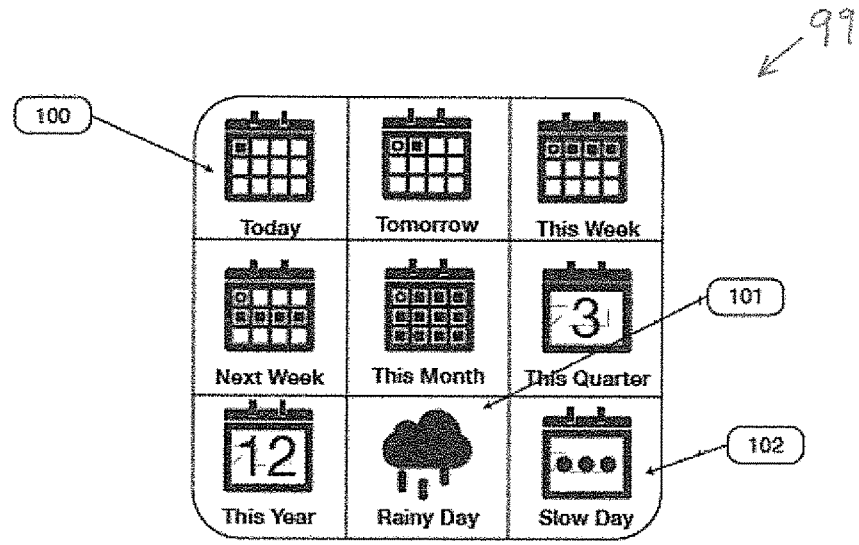
FIG. 2 is a screen shot of a mobile wireless communications device in accordance with one example embodiment providing work scheduling features.
Figure 3:
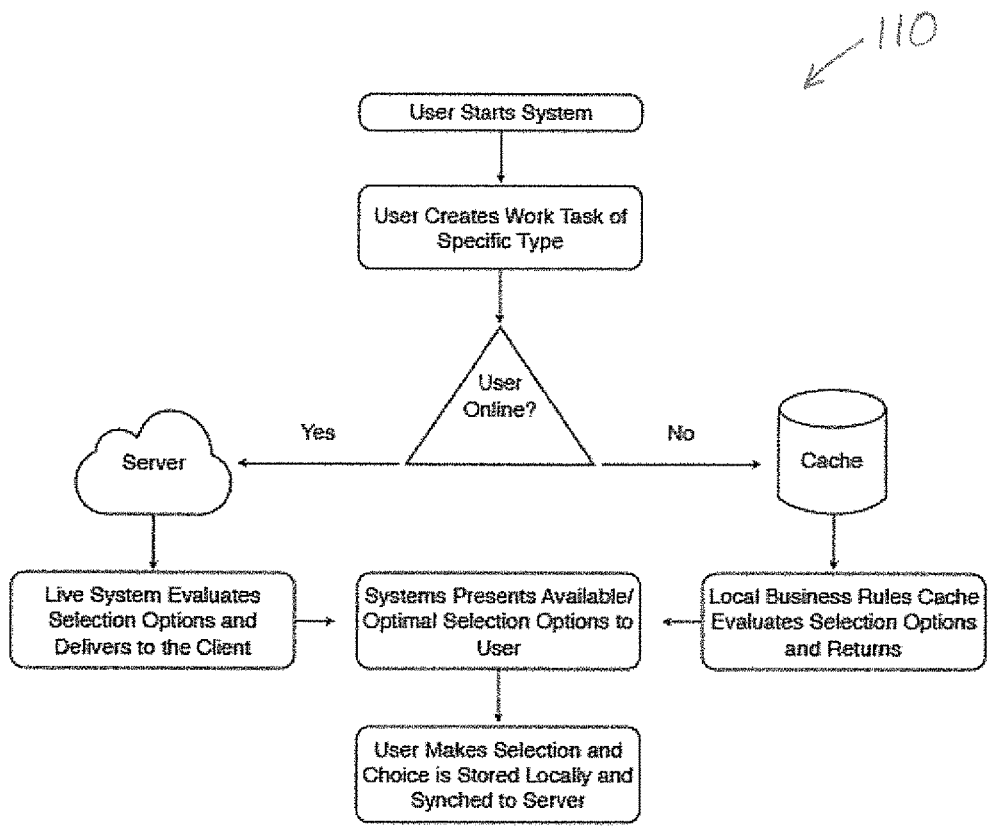
FIG. 3 is a flow diagram illustrating work scheduling method aspects associated with the mobile wireless communications device of FIG. 2.

Referring now to the communication device screen shot 99 and flow diagram 110 shown respectively in FIGS. 2-3, an example embodiment for scheduling work activities for periods of time using non-date specific terms relatable to a user is first described. The embodiment provides for single-action selection of natural language work periods on a computer device. The single-action selection system may expedite the scheduling of work activities using terms which are more relatable to the typical user for calendar periods, events, seasons or activity levels. Examples include Emergency, Today 100, Tomorrow, This Week, This Weekend, Next Week, This Month, This Quarter, This Year, Slow Day, Spring, Summer, Fall, Winter, All Holidays, Times of Day. These periods may be calculated on the given device 32a-32n, or passed to the server 31 for calculation. The selection may be for a period that is incalculable at the time of selection with the device's available data. The selections may also be for events that may occur in the future and are monitored by the server 31, which triggers a predetermined action when logic determines the event has occurred (e.g. a weather change 101, etc.). The selections presented may be contextual given the work type. For example, an indoor activity may not offer the selection of a weather event. The selection may also be unrelated to a specific time period and instead indicate to the server 31 that an activity should be scheduled when work levels trend below a predetermined level (e.g. Slow Day 102) or when required resources will be available. The server 31 may also maintain a separation window of scheduled activities to make certain that work of the same type is not scheduled within a window of time after the date of last occurrence. The system 30 may also allow for the distribution of additional timeframe options without requiring the user to perform a software update.

Figure 4:
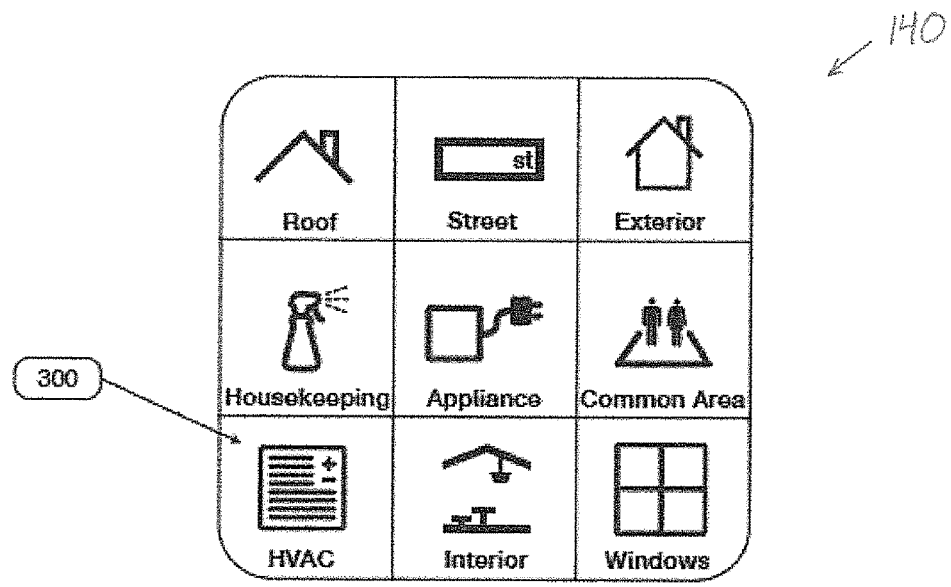
FIGS. 4 and 5 are screens shots of a mobile wireless communications device in accordance with another embodiment of the present invention providing work classification features.
Figure 5:
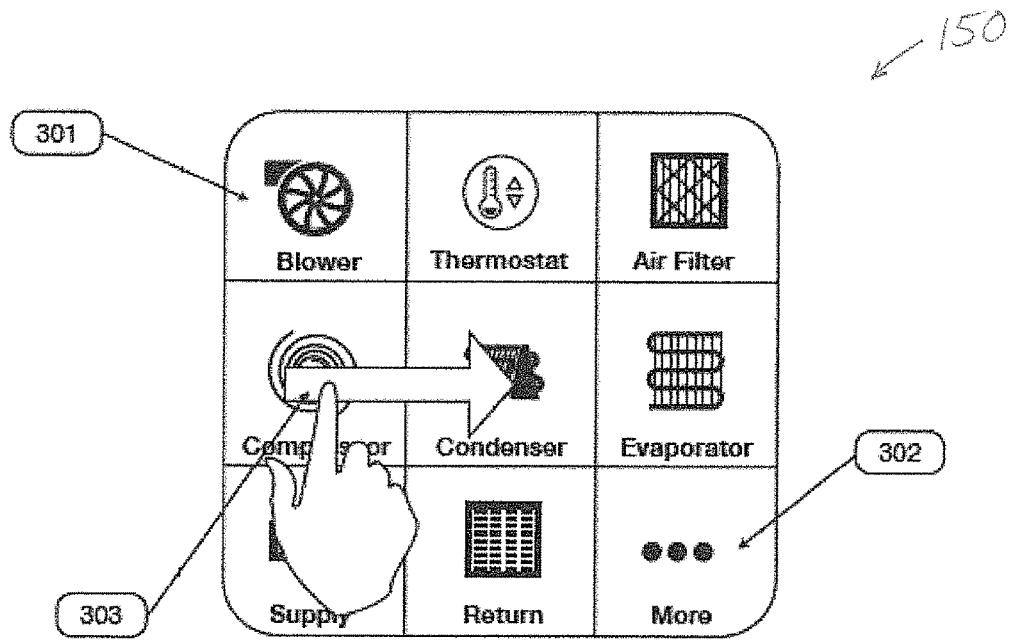
Figure 6:
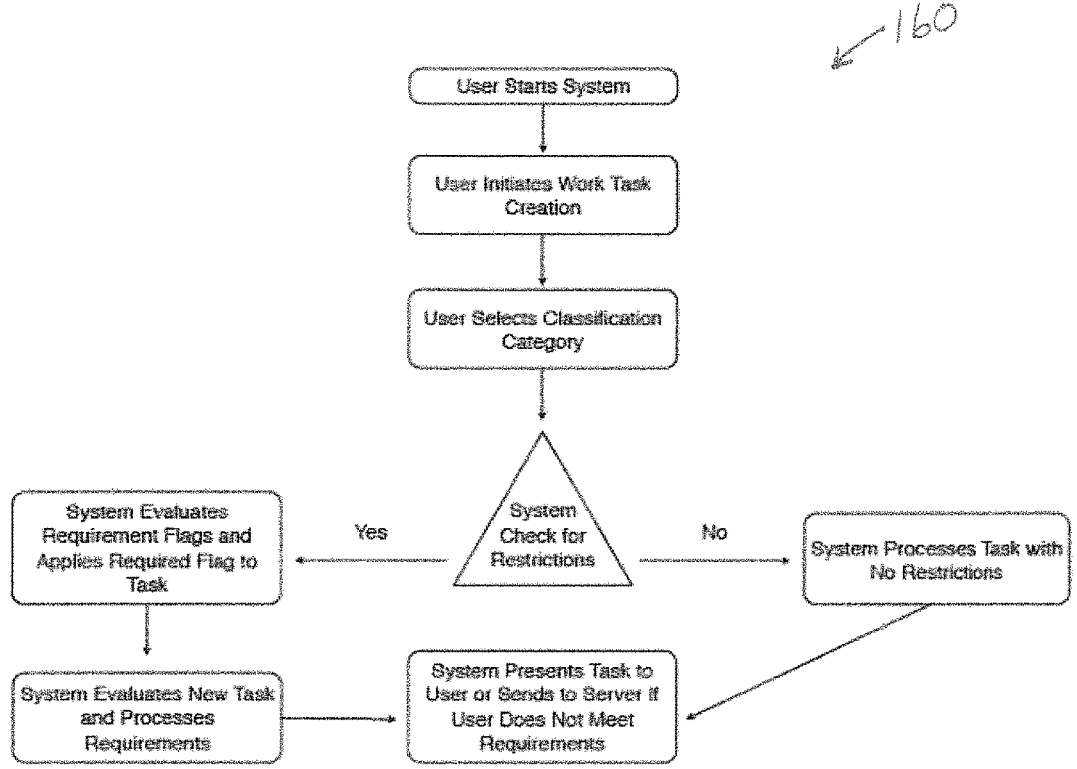
FIG. 6 is a flow diagram of a routine that determines whether assignment considerations should be applied based on the work classification.

Turning to screen shots 140, 150, and the flow diagram 160 shown in FIGS. 4-6, respectively, in accordance with another aspect work may be categorized into categories and sub-categories in a "linear" and visual manner in an example embodiment. More particularly, an approach is provided for selecting work categories 300, sub-categories 301, timeframe, assignee, location and other work task attributes via a linear panel flip metaphor. In accordance with another example embodiment, the work task attributes can be completed in a non-linear fashion with locators providing input into the process so that portions of the process can be pre-filled and not appear to the user. In still another example embodiment, the flip metaphor can be substituted with a panel sliding transition. The system enables a user to navigate to previous panels via a left to right (or other directional) swipe 303 within the linear flow to change their original selections. The presented options within each panel may be dynamic to the configuration of the user's work location, e.g., a worker in a building that does not have a pool would not be presented with the pool category. That is, the server may cause the given communications device to display or present appropriate categories/sub-categories based upon the facilities in a particular building or property, and such facility information may be stored at the server. The arrangement of the options on the panels may also be driven by previous selection patterns or other approaches which may determine the likelihood of selection based on various factors. The selection options may convey additional attributes, preferences or restrictions for the next panels or other business rules processed for the user whether connected or disconnected from the system server. The options may include whether the work was to be conducted outside or indoors, and whether it required special regulatory certification or company training. If further approval was required before the work could be started, this restriction may also be set via a selection. Whether the work within that category should be viewed as an emergency when selected may also be set by selection. Whether the work should be logged for documentation purposes, and whether the work may result in the replacement of an item that needs to be recorded for inventory or other tracking purposes may be options as well. The panel grid may be "intelligent" to display only those items available at that stage of the work process, and page the items if there existed too many to list within a single grid panel with a "More selection" option 302, for example.

Figure 7:
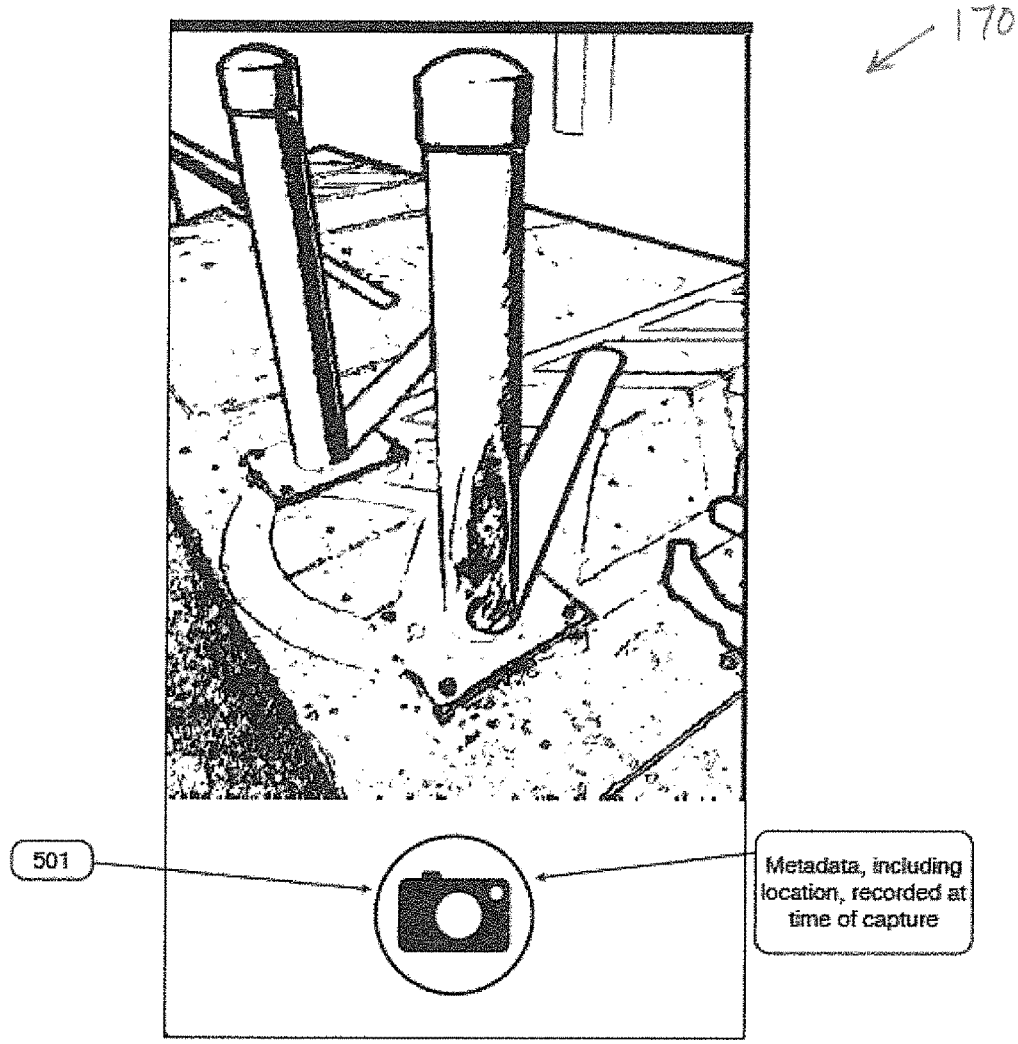
FIGS. 7 and 8 are front views of a mobile wireless communications device in accordance with still another embodiment of the present invention providing visual work entry features.
Figure 8:
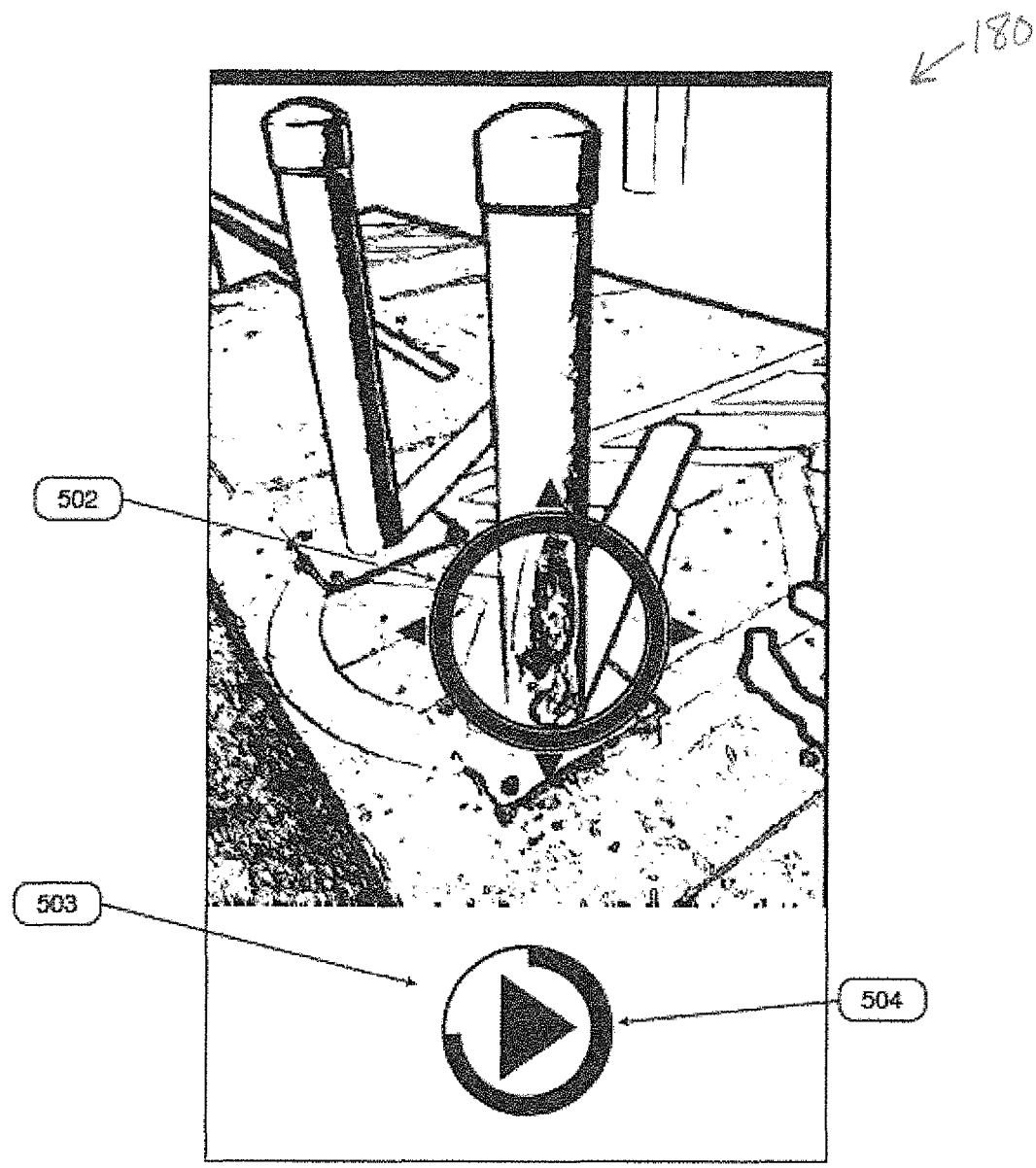

Turning now to the respective screen shots 170 and 180 of FIGS. 7 and 8, another aspect is provided for creating work tasks using a visual method. More particularly, this allows for creating work tasks using photos 501, videos, audio 503, location, a visual marker, combinations thereof, etc. This may provide a replacement or complement to textual documentation. A visual capture mechanism is provided which, when activated, records certain metadata such as location, orientation, time of day, user and other attributes, and then appends that information to the task record. The image used to record the subject, issue or instruction may be augmented with a reticle, drawing or visual effect 503 to mark a specific area for attention or focus. The capture button for the different attributes, if initiated by the user, may be placed in a unified position and assume a similar appearance to relate both the attribute type, state and potential action 504 of the button. The resulting task documentation could then be merged to comprise a single record or file to ease recall in a system or sharing over email or text messaging. In the illustrated example, a pipe to be repaired is identified in an image taken by the user on a mobile device with a camera, which also record the location where the image was taken.

Figure 9:
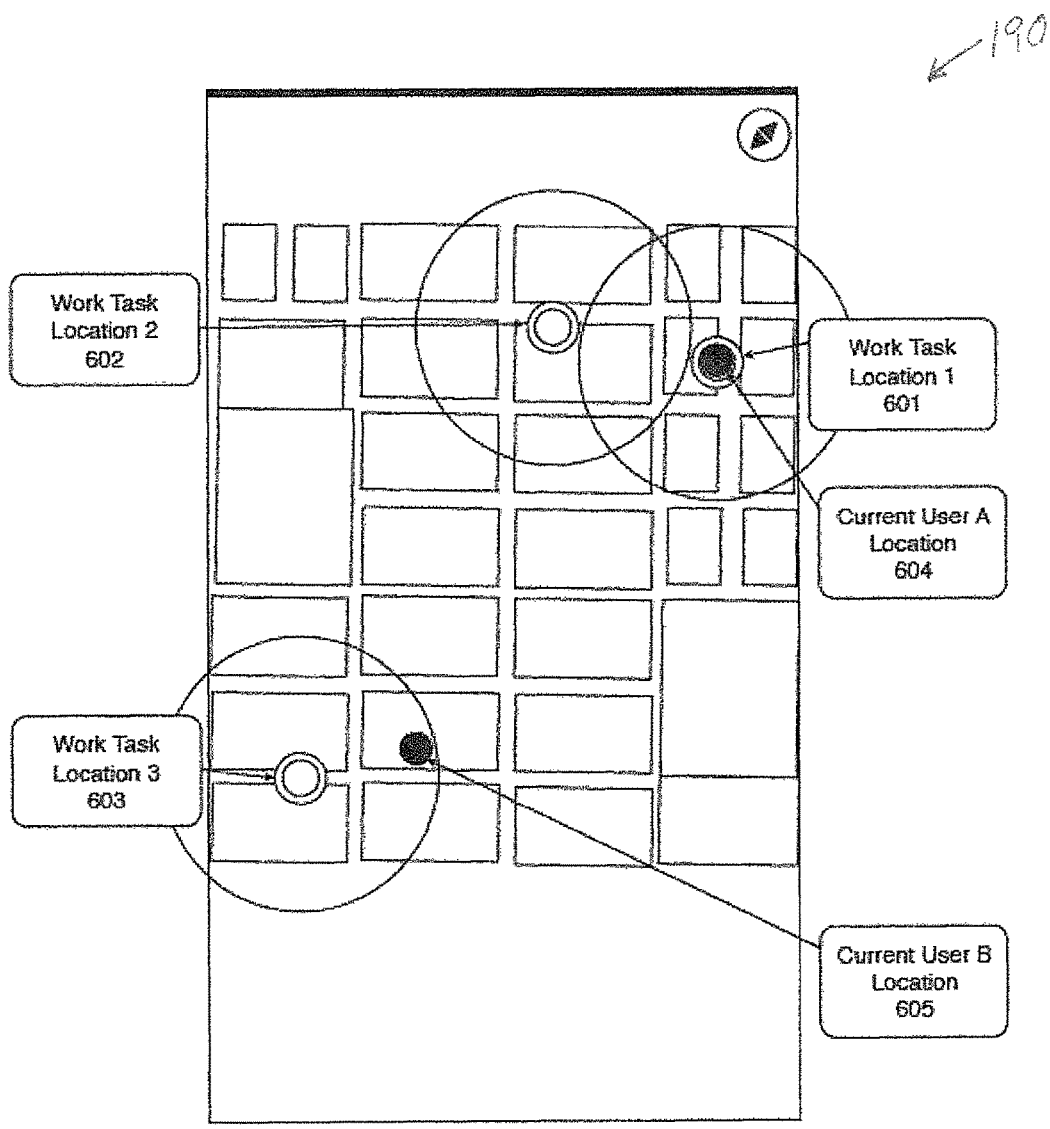
FIG. 9 is a screen shot of a mobile wireless communications device which may be used for determining user task assignment based on the location of the work to individual users in accordance with an example embodiment.

Referring to the screen shot 190 of FIG. 9, another aspect relates to assigning and prioritizing work tasks based on various attributes. More particularly, the assignment and priority of work tasks may be optimized using location, training levels, user skills, task completion progress, task efficiency and resident satisfaction intelligence. The system may provide a method for automated application of procedures or rules based on the aforementioned attributes. In one embodiment, the system may detect the position of a user A 604 and User B 605, as well as the positions of work tasks at Location 1 601, Location 2 602 and Location 3 603, and accordingly determine a desired assignment based on the users' current positions using a variety of methods including direct line-of-site, walking route, driving route or other paths, etc. The system may use a variety of assignment approaches with different goals, e.g., task completion speed, resident satisfaction, task resolution cost, technician training or other methods with different business goals.

Figure 10:
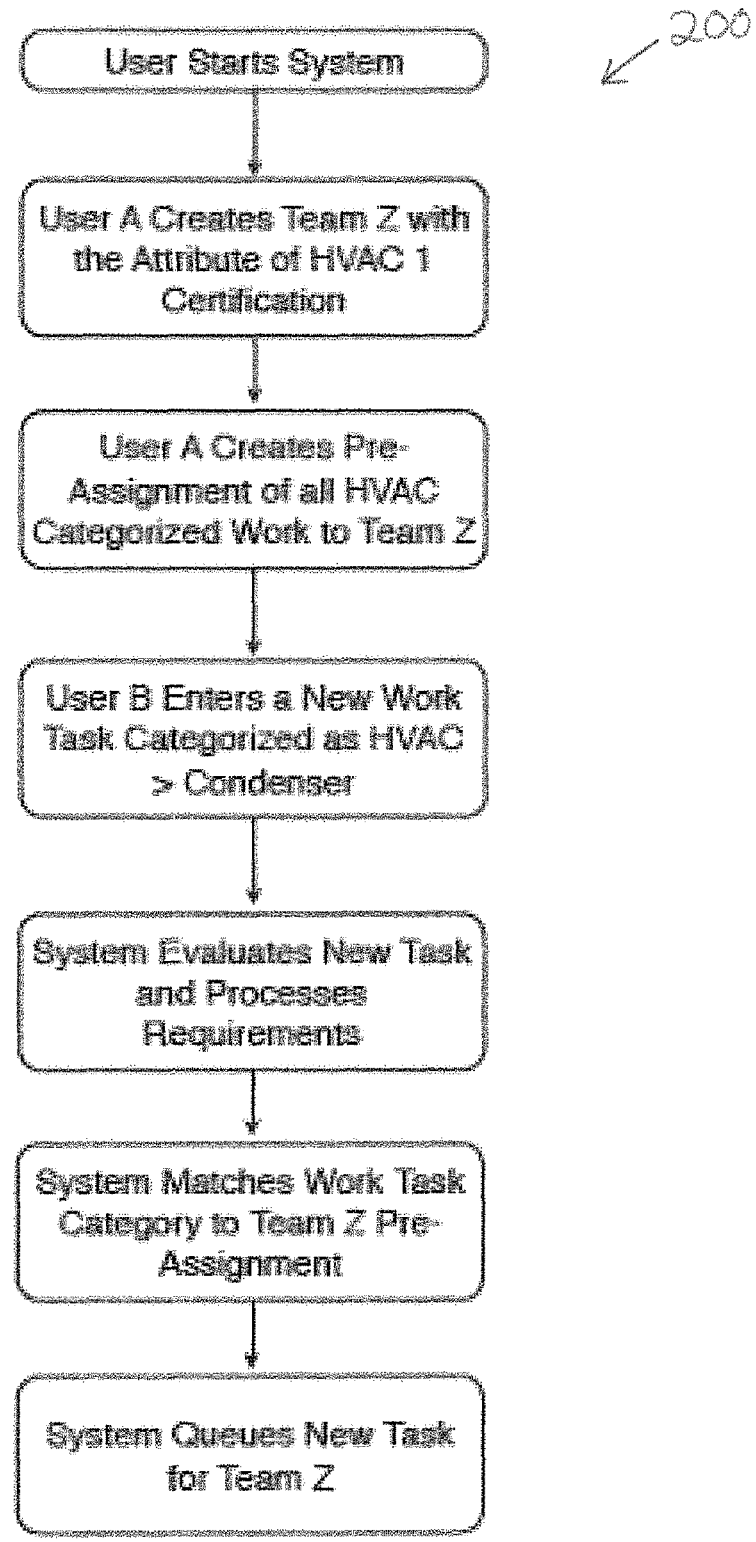
FIG. 10 is a flow diagram illustrating method aspects for which individuals should be added to specific groups for tasks in accordance with an example embodiment.

Referring to the flow diagram 200 of FIG. 10, in accordance with another example aspect, the system 30 may define or assign groups based on relationships and attributes populated dynamically by the system. More particularly, group attributes may be defined and automatically applied to the creation and maintenance of group membership based on attributes which may include performance, certifications, achievements, skills, experience, geolocation, function, role and other criteria. The system may provide the ability for a group to be assigned work automatically based on work classifications associated with the group. For example, a group could be assembled that have skills and experience replacing bulbs in high bay lighting and all work that is classified as lighting>high bay could be automatically assigned to that group. In the example illustrated in FIG. 10, a group assignment is made based upon the HVAC certification level of potential group members.

Figure 11:
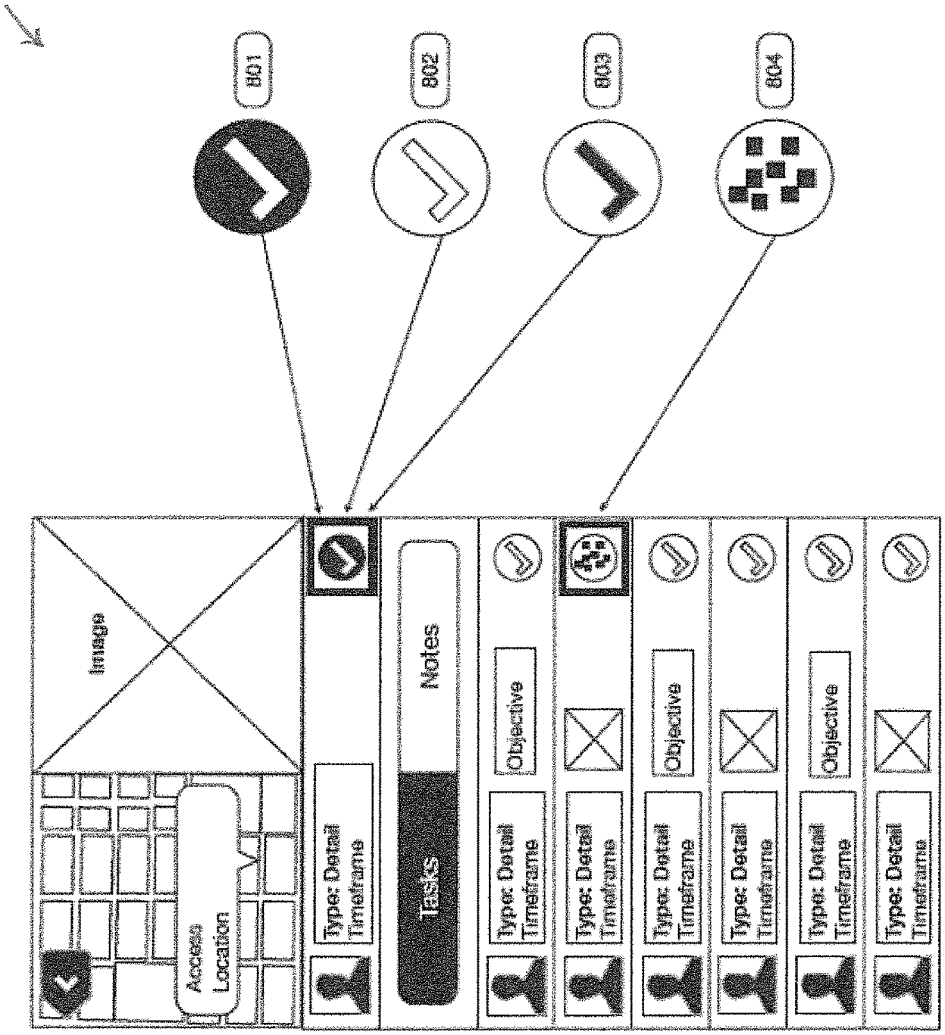
FIG. 11 is a screen shot of a mobile wireless communications device in accordance with an example embodiment providing user task completion guidance.

Turning now to the screen shot 210 of FIG. 11, another example aspect relates to providing task completion guidance. More particularly, the system 30 may deliver user guidance on the order and accepted methods of completing a task or task series using a combination of the user's geolocation and other inputs including (but not limited to) scanned identifiers (e.g., QR Code, NFC, etc.) and completion attributes such as whether the task is associated with an item to be logged or could result in a part replacement or warranty claim. The user's location (and, correspondingly, the location of an asset) may be determined by various sensors on a given communications device 32*a*-32*n*, such as a satellite positioning receiver (e.g., GPS receiver), WiFi transceiver, cellular transceiver, Bluetooth transceiver, RFID or NFC transceiver, QR code scanner (e.g., an image capture sensor), etc. Before all tasks are completed, the primary task checkbox may be in a disabled state indicating it is not possible to complete 801 at that time. When all secondary tasks have been completed, the primary task checkbox may become an enabled, but incomplete version, meaning the task is now available to be completed 802. When the checkbox is then tapped, the checkbox turns into the completed version 803. If the task requires a QR Code, tapping the icon will initiate the scanning process 804. These icons may also represent other methods of completion such as signature capture, NFC scan, photograph, video, condition or severity rating, or inputs from external sensors.

Figure 12:
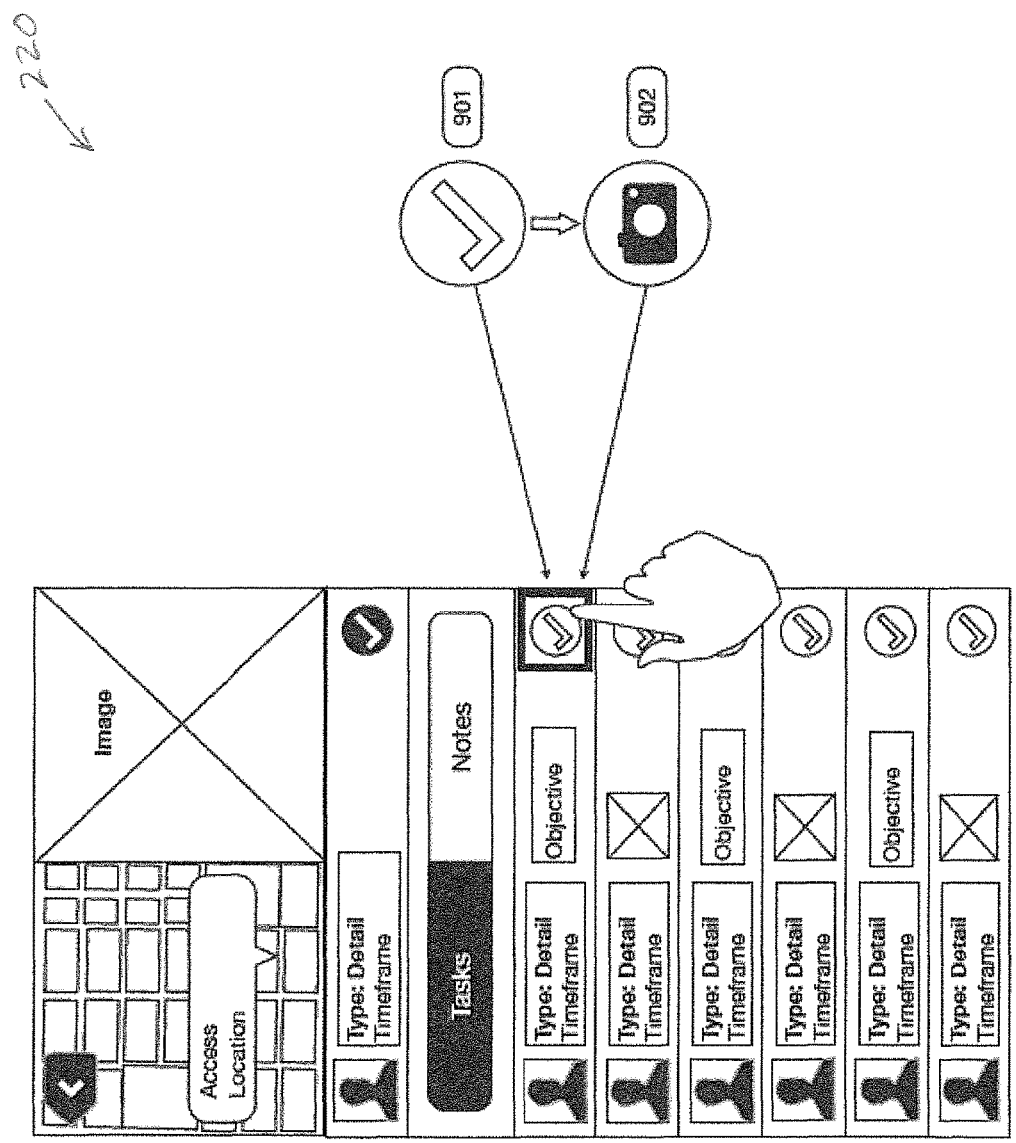
FIG. 12 is a screen shot of a mobile wireless communications device in accordance with an example embodiment providing work task completion verification.

Referring now to the screen shot 220 FIG. 12, another example aspect relates to verifying work task completion. This allows for presenting and requiring a user to document or verify visually or through a sensor the work he is marking complete. When a user attempts to mark a checkbox or other completion method that is in an active state, meaning available to be completed, the system 30 may require, randomly or based on settings such as training or performance improvement plan, an additional intermediate step to document the physical task that was completed with a signature capture, Bluetooth, RFID or NFC scan, photograph, video, condition or severity rating, or input from an external sensor, for example. The task would be first presented using a standard completion indicator 901, and upon tapping the icon would change to represent the intermediate documentation indicator 902 (here an image capture indicator). The presence of the secondary completion or work verification step may be opaque or hidden from to the user prior to tapping the initial completion method.

Figure 13:
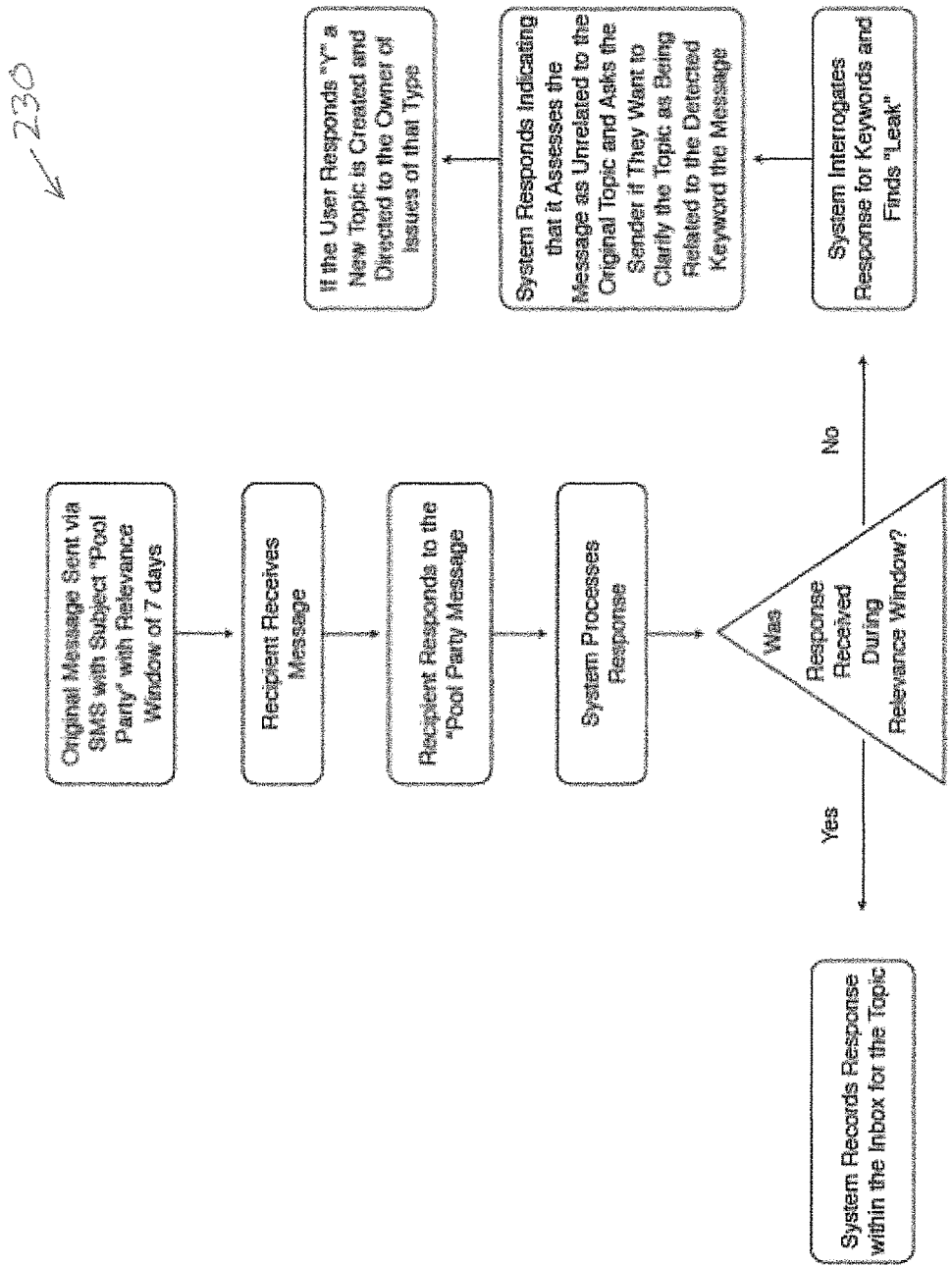
FIG. 13 is a flow diagram illustrating method aspects for determining to which subject a communication response should be linked in accordance with an example embodiment.

Turning now to the flow diagram 230 of FIG. 13, another example aspect relates to determining to which subject a communication response should be linked. For example, communications such as email, SMS, twitter message, facebook message and voice mail may be automatically associated with a topic other than the originating topic. The system 30 may detect and reconcile a response from the original recipient of a message that is for a matter other than the topic of the originating message. A sender may set a topic for an outgoing message along with a relevance window, expressed in a calendar timeframe, for that topic directing responses within the relevance window to a specific message box. Responses received outside of the window of relevance may be interrogated by the system. Business rules and key-word searching may be provided as inputs to drive a series of pre-determined or system-generated questions to the user to merge the response with another topic thread or confirm the appropriate topic. The messages may be associated with a resident automatically based on the send email address or SMS associated phone number or other account identifier and included with the resident record. The system 30 may also use responses as a method for a user to provide access authorization to a physical premise.

Figure 14:
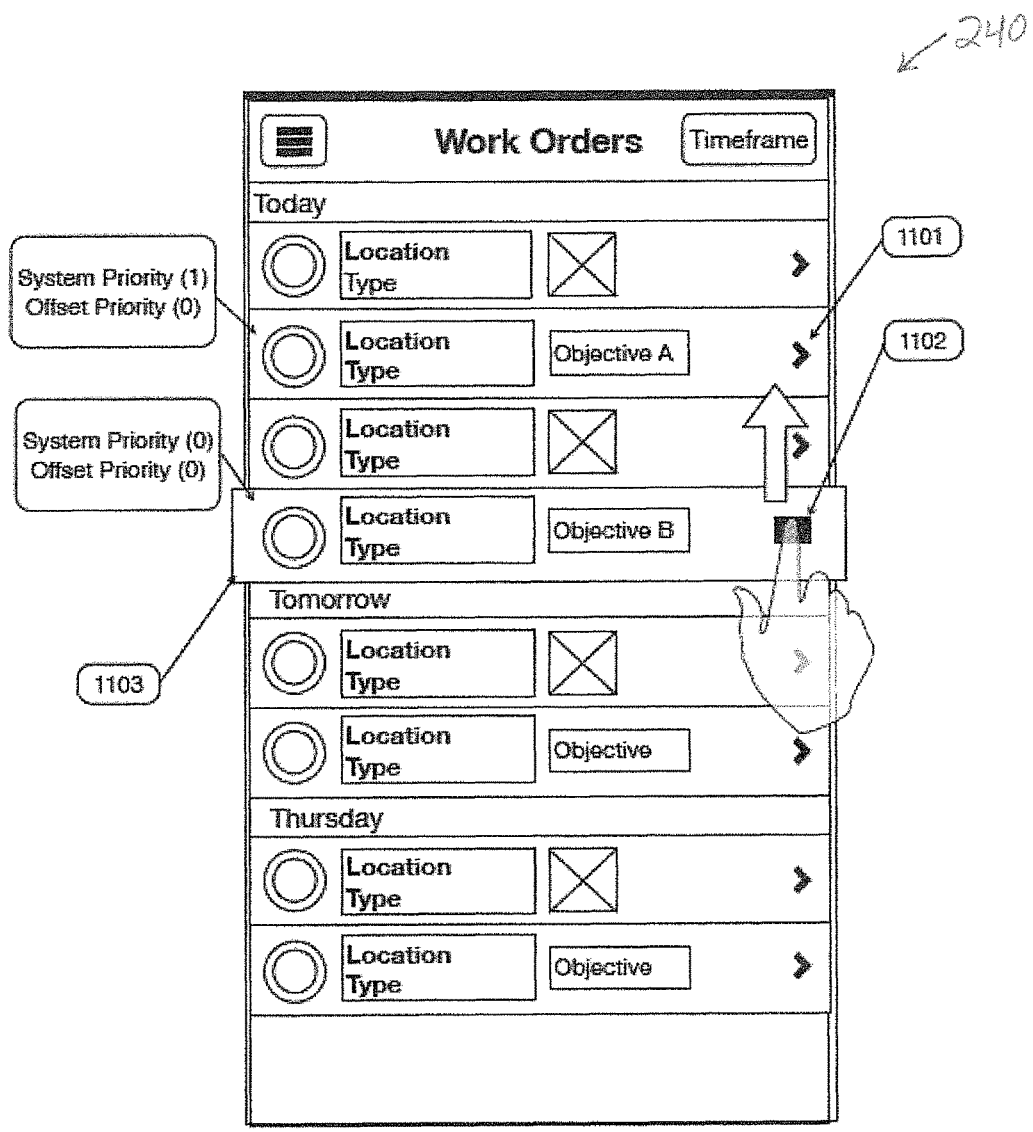
FIGS. 14 and 15 are screen shot of a mobile wireless communications device in accordance with an example embodiment providing visual task prioritization features.
Figure 15:
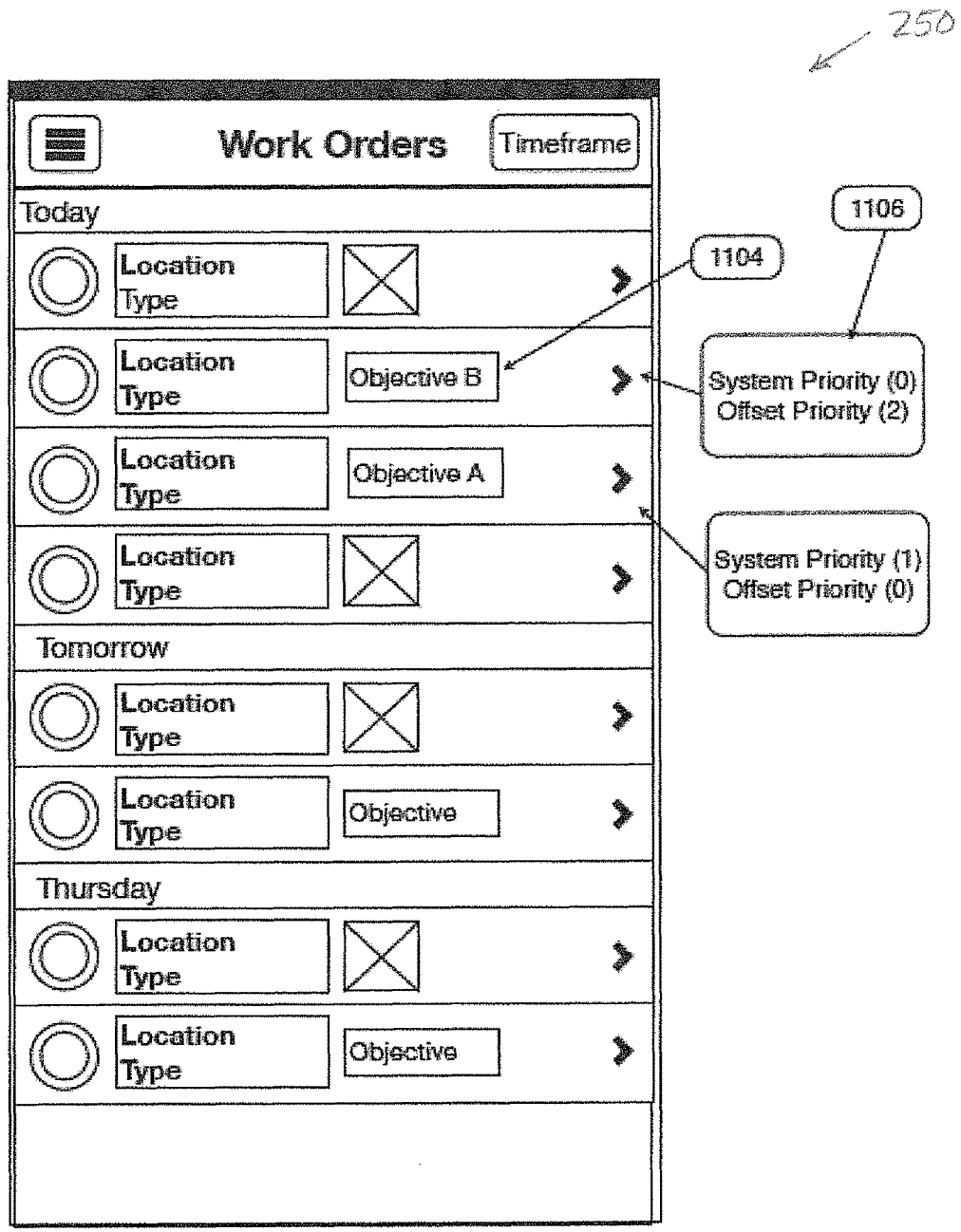

Referring additionally to the respective screen shots 240 and 250 of FIGS. 14-15, another example aspect allows for prioritizing tasks relative to other tasks in a visual manner. Tasks may be rearranged to set the relative priority of each task in a descending sort. When tasks are listed the system 30 may provide the user the ability to tap and hold on a task row which would change the state, indicated by the disclosure chevron 1101 changing to a grab bar icon 1102, of that row 1103 allowing it to be moved. In another example embodiment, the grab bars are not displayed and the potential of a user to move the task row is indicated with a shadow effect. If the user then moved the row above or below another row the system 30 would visually place that row in the new position 1104 and update a priority value to record the position relative to the other tasks. The system 30 may maintain multiple (e.g., two) values for priority—one that the system would determine based on a series of rules, and one used to indicate the offset needed to hold the task in the priority position it was dragged by the user. These two values are referred to as system priority and offset priority respectively 1106. This arrangement enables the priority value to be used globally across the system regardless of whether the task is transferred to another user. A flag may be set in the system 30 enforcing the order in which the tasks were accessed so that the highest priority task would be the first (and optionally only) item available to be worked. The system 30 may also prevent movement of tasks from one grouping of work, such as a date or location group for example, to another. Other priority indicators that may be used by the server 31 for assigning work order priority may include a priority level indicated by a user generating the work order, a relative priority (e.g., based upon a work order history and/or how many jobs were previously performed for a given user or asset, such as higher priority where prior works orders have already been performed), a user priority (e.g., certain users have a higher priority for work orders they generate), etc. Another priority indicator may be a time the work order was received (e.g., the longer a work order has been pending the greater its priority). Various combinations of these indicators and/or rules may be used to determine work order priority, and the priorities of work orders may change over time as new work orders are created, etc., as will be appreciated by those skilled in the art. As used herein, "work order" may include various action items such as service requests, routine maintenance or checks, replacement, inventory checks, etc.

Figure 16:
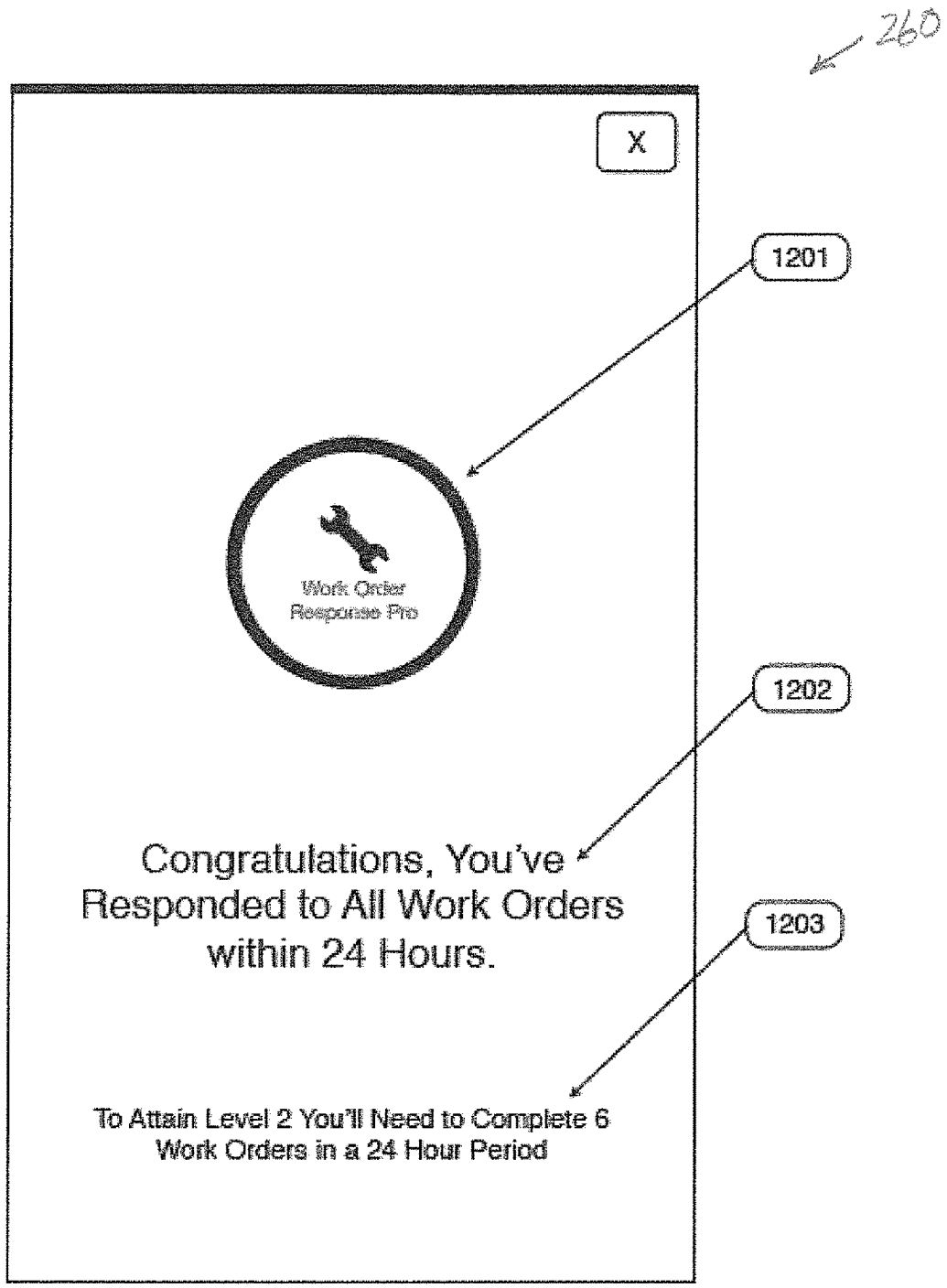
FIG. 16 is a screen shot of a mobile wireless communications device in accordance with an example embodiment providing task completion guidance features.

Turning to the screen shot 260 of FIG. 16, another example aspect relates to providing task completion guidance. The system 30 may provide for delivering recognition and rewards based on skill mastery, work completion, teamwork, customer satisfaction, safety goal attainment and other measures or goals in a task-based work environment. The model may provide users visual cues in the user interface to indicate the relationship between their work and the potential awards 1202, such as the task of disabling a energy consuming appliance when not in use and an Energy Saver achievement badge, their achievement of designated awards (Presented as badges 1201), the steps needed to attain the next level within an achievement path 1203 and, links between the achievement program and their compensation, for example.

Figure 17:
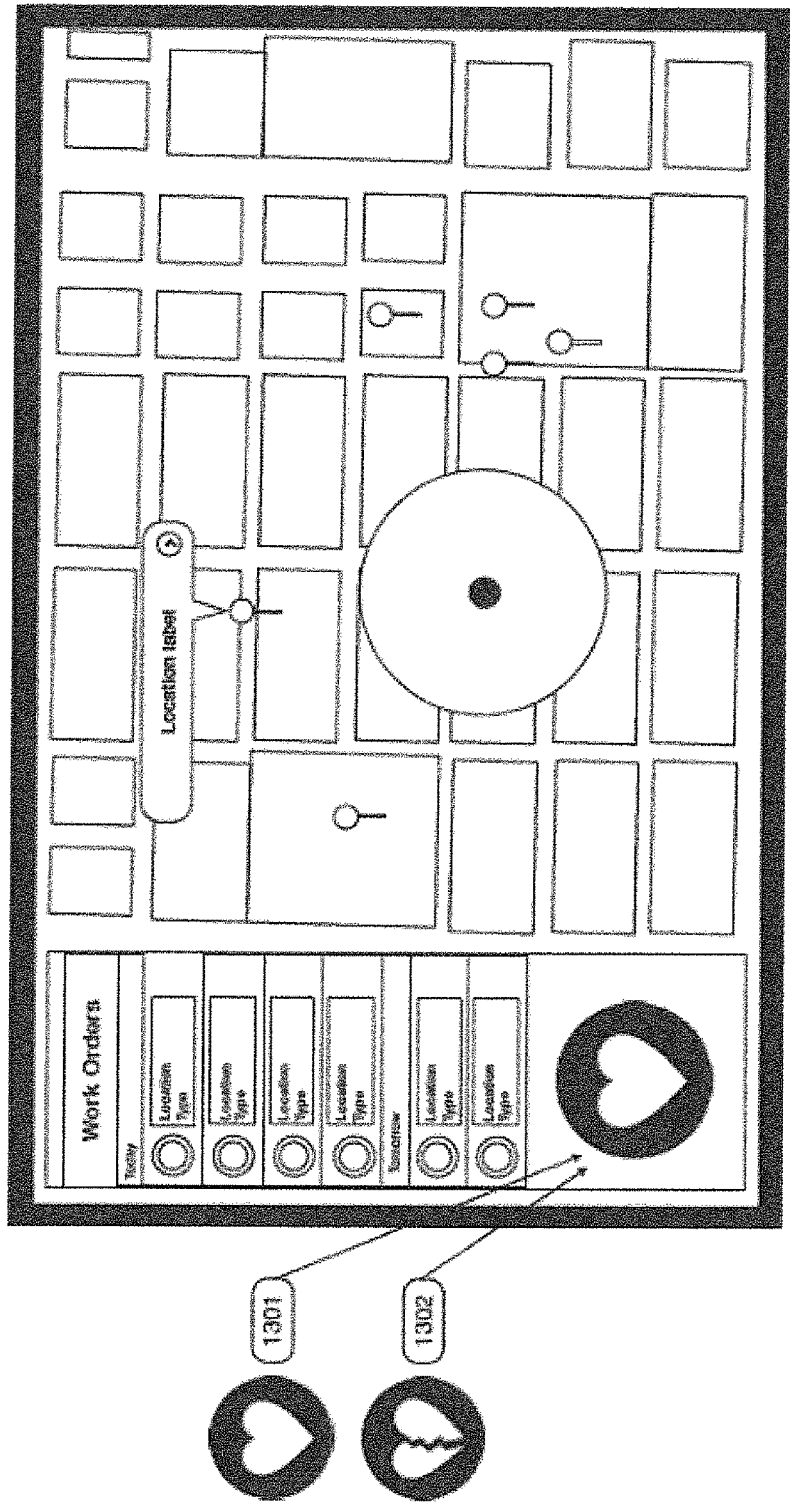
FIG. 17 is a screen shot of a mobile wireless communications device in accordance with an example embodiment providing visual performance metric features.

With reference to the screen shot 270 of FIG. 17, another example aspect is for presenting performance to pre-assigned goals in a visual manner. More particularly, the system 30 may provide for calculating and displaying a unified visual performance indicator for which status may be assessed quickly and understood by a broad set of users with little or no training. In one embodiment, the primary indicator is a heart which is displayed in various states such as Healthy 1301, Athletic or Unhealthy 1302, etc., to represent a performance level. The indicator may provide an "at-a-glance" view of the general health of the performance metrics and quickly represent, through its changing state, underlying issues. The indicator state may be calculated from a combination of weighted key performance metrics such as the time to resolve a work task or the responses to customer satisfaction surveys, for example. The indicators' accessibility for general users and simplicity will help establish it as a key reference point for workers when discussing the "health" of the service operations. The input key performance metrics could also weighted differently to adjust for changes in management strategy.

Figure 18:
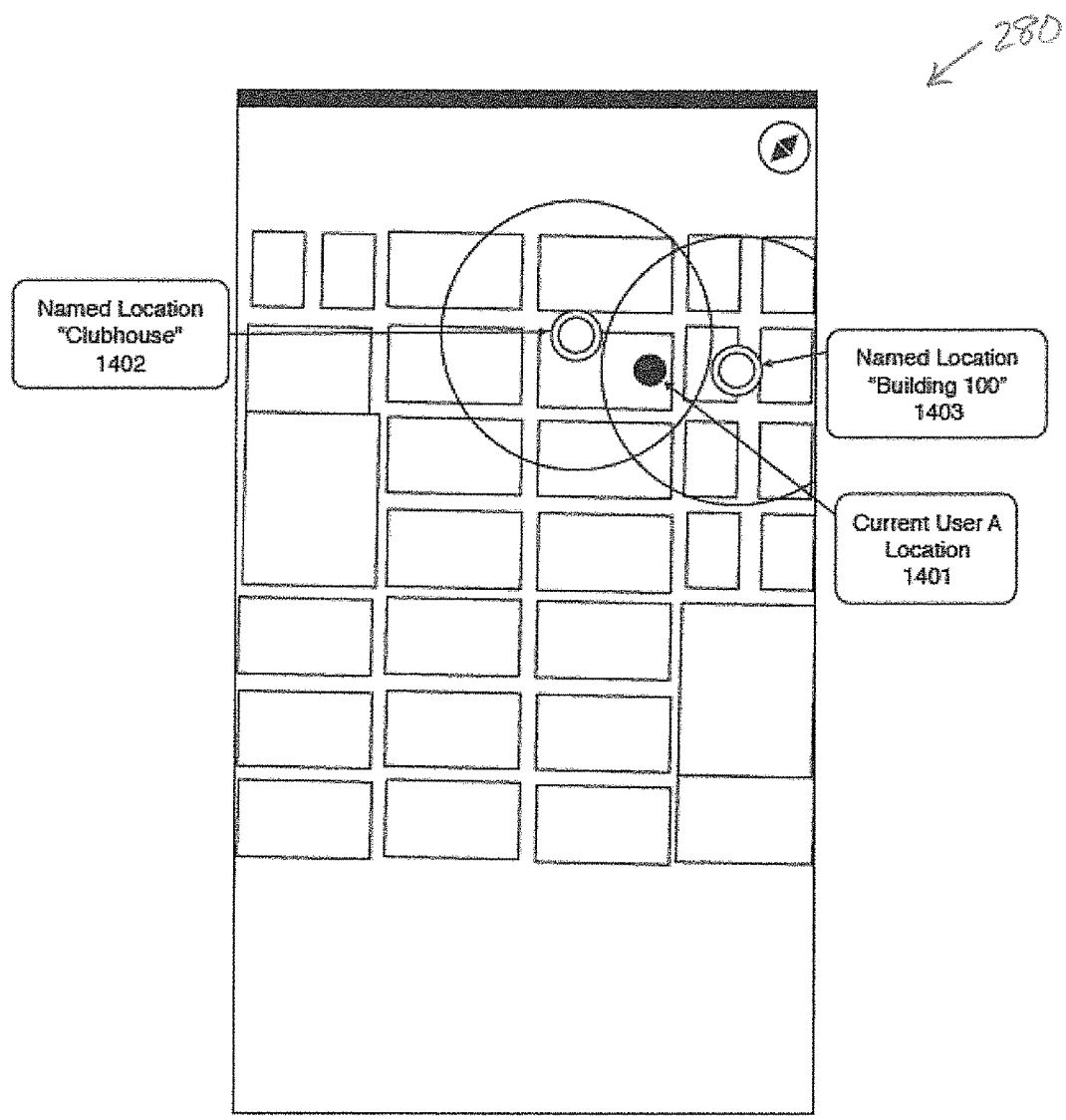
FIG. 18 is a flow diagram indicating methods aspects for associating named places or locations with geo-locations.

Turning to the screen shot 280 FIG. 18, another example aspect relates to hierarchical representation and identification of geolocation positions. The system 30 may represent in a hierarchical fashion various locations and features of a physical property. Locations may be assigned a parent leading to the Location Root, which is the location above which no additional location exists (no parent). An example is a bed>room>unit>floor>wing>building>phase>property>campus, with the campus representing the Location Root. Each location may be named and defined by a geographic center point and radius. Identification of the named location may include factors such as the work task type, inventory and other attributes. For example, a user may be located at a position on a property 1401 that is near and within the geo-fence of two named locations. The work task classification is set to Fitness Equipment, the Clubhouse 1402 location contains inventory items of type Fitness Equipment, but the other location Building 100 1403 does not. As such, the pre-selected named location would be Clubhouse.

Figure 19:
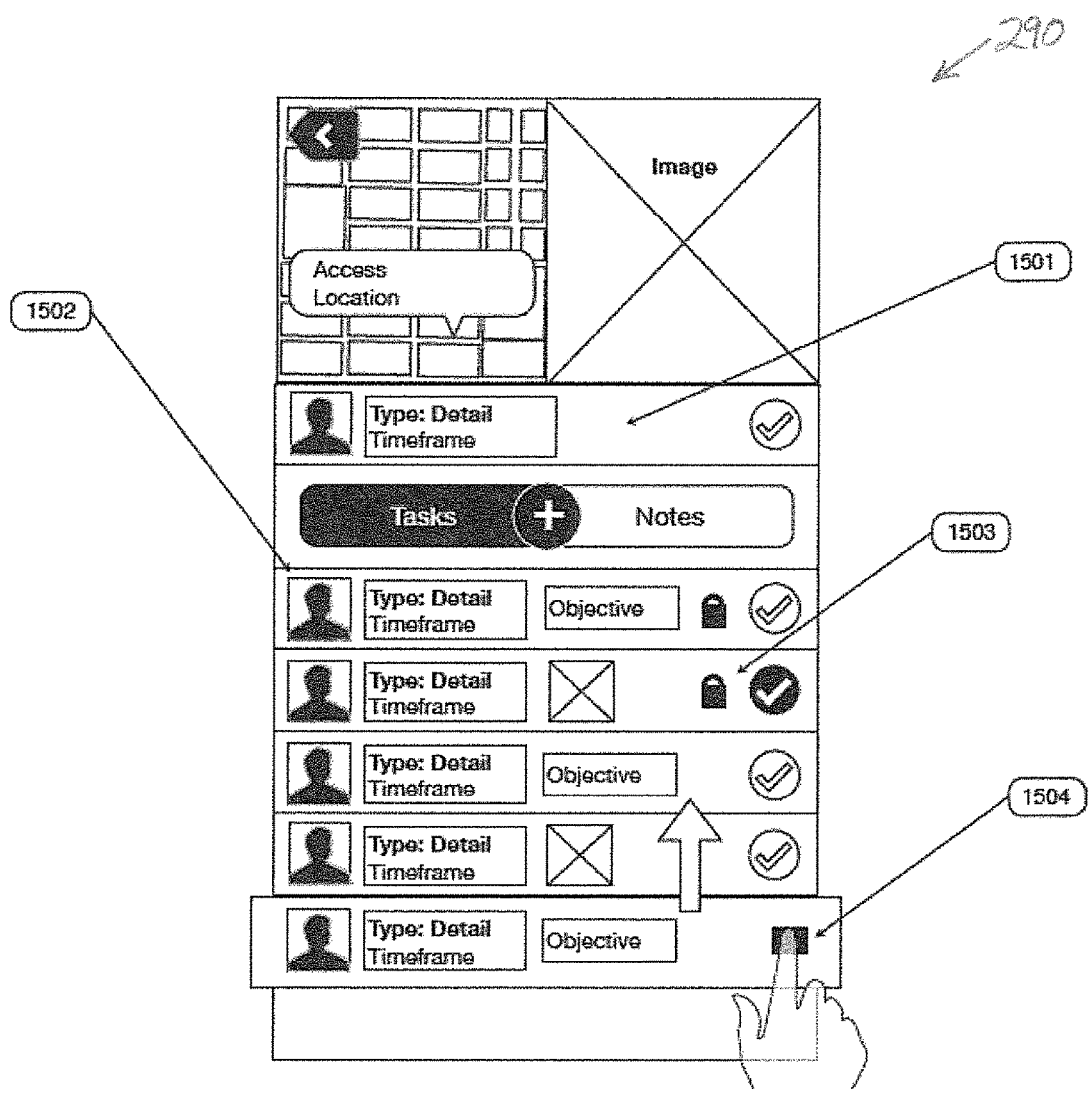
FIG. 19 is a screen shot of a mobile wireless communications device in accordance with an example embodiment providing multi-task work assignment features.

Referring now to the screen shot 290 of FIG. 19, another example aspect relates to creating a multi-task structure for multi-step and multi-assignee work. The system 30 may allow for division of a monolithic work project into sub-tasks which may have a distinct classification, timeframe (optionally limited to the timeframe of the parent task), billing type and completion criteria. These sub-tasks may also be separately assigned, including to vendors. In one embodiment, the parent task would be separately displayed 1501 in the UI from the sub-tasks 1502. Sub-tasks may be added and assigned a subset of the attributes available to the parent task. The sub-tasks may be listed in order of intended completion, and the sub-tasks may be available for the user to tap and hold on a sub-task row, which would change the state. This is indicated by a grab bar icon, or in another embodiment a shadow effect, 1504 appearing instead of the completion criteria of that row, allowing it to be moved. If the user then moved the row above or below another row the system would visually place that row in the new position and update an order value to record the position relative to the other sub-tasks. The sub-tasks may also optionally be locked so that the position of an individual sub-task cannot be changed. Locking a sub-task in the first or last position may prevent other sub-tasks, including newly created sub-tasks, from being moved before or after the locked sub-tasks. This essentially book-ends the locked sub-tasks to ensure they are the first and last sub-tasks regardless of order changes or new sub-task creation. Adjoining sub-tasks that are both locked may invoke a dependency, so that the second ordered sub-task 1503 would be dependent on the first to be completed before it is available for completion. The system 30 may limit the availability to lock, unlock or re-arrange the order of sub-tasks based on a permissions model.

Figure 20:
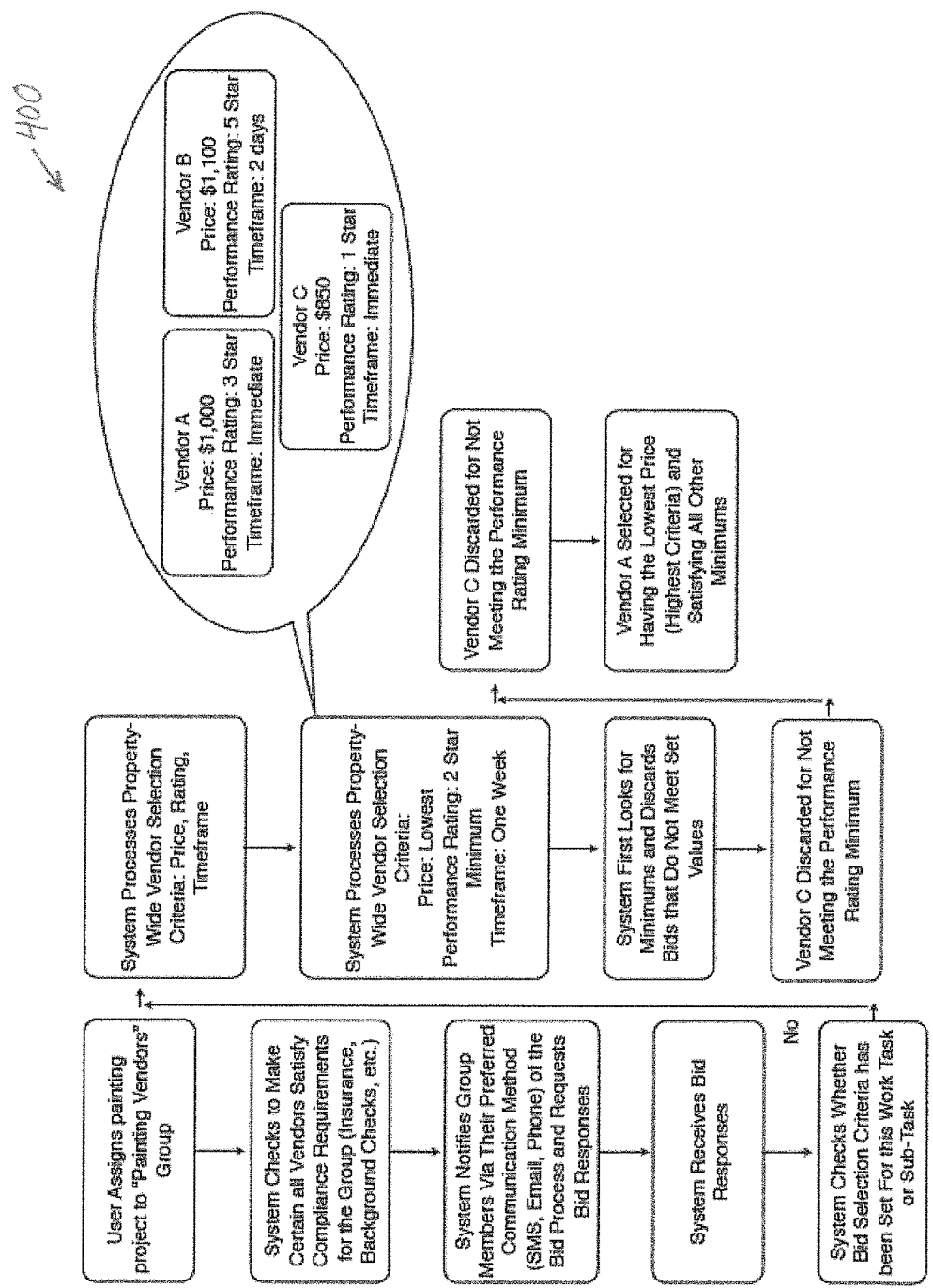
FIG. 20 is a flow diagram illustrating method aspects for determining bid selection amongst a group of third-party vendors.

Turning to the flow diagram 400 of FIG. 20, another example aspect related to managing bid selection for work tasks. More particularly, the system 30 may provide for requesting, managing and coordinating work bids with third-parties and reconciling the accepted bids with the final submitted invoice. The system may automate the bid request and selection process for a user based on criteria set prior to or during the creation of the work. A user may create a new work task and assign it to a group of third-party contractors. For example, the user may assign a painting task to the Painting Vendors group. The system may then submit the collected documentation of the task (objective, classification, bill type, timeframe, etc.) to each of the individuals or organizations with a single assignment action from the user in one embodiment. The system 30 may evaluate the bids and make the selection based on pre-defined criteria. If the user has the permission and so chooses he may optionally also set the bid selection criteria to include options such as price, timeframe, past performance rating, or a combination thereof, including the ability to rank the criteria and set minimums. In a ranking approach, the system 30 may evaluate the first criteria and if those responses were an exact match (or within a threshold range considered effectively exact) across multiple vendors then the system may evaluate the next criteria until it reached a distinguishing criteria, at which point one vendor would rate higher than the other bid participants. Other approaches, such as a weighted average of factors, may also be used. If all of the criteria responses were effectively the same, or instead of a ranking approach, the system 30 may use an alternative method of selection, e.g., equally distributing work to available or qualified vendors to encourage a healthy vendor ecosystem. The system 30 may also surface or otherwise provide a notification of other potential vendors to the user through a directory listing or direct suggestion, for example.

Figure 21:
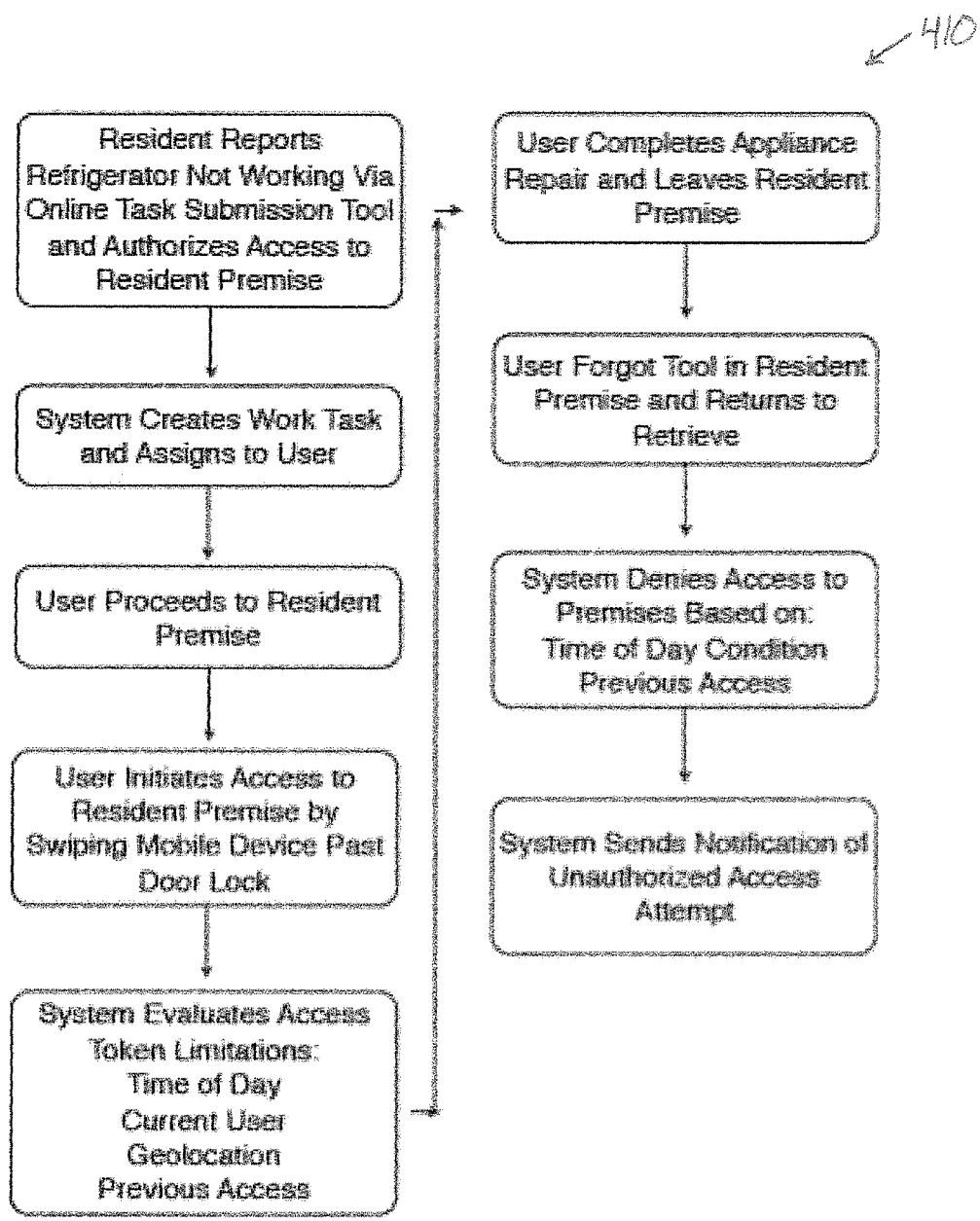
FIG. 21 is a flow diagram illustrating method aspects for distributing electronic keys to a user.

Referring to the flow diagram 410 of FIG. 21, another example aspect relates to distributing electronic keys in a service dispatch system. More particularly, access tokens may be distributed to users based upon work tasks. To facilitate access to locations where work is scheduled and to prevent unauthorized access to resident premises when unnecessary, the system 30 may accommodate the creation, expiry, revocation and limited use of electronic keys. The keys may be distributed to the users via a service dispatch system, so keys are only provided when necessary to complete an assigned task and the use is recorded in the service dispatch system. The distribution mechanism may take the form of an encrypted token requiring a public and private key arrangement. The various lifecycle milestones for the electronic key may be tracked in the system 30 so that when a key is created, revoked, expired or used a record will be made for reporting purposes. The restricted use capability will enable scenarios where a key may be used only within a certain window of time or for a set number of uses. For example, a user may be granted a key to enter a resident's premise for the repair of an appliance only during work hours and only for opening the door a single time. The system 30 may further restrict access so that the electronic key is only valid to specific individuals, and only while they were actively logged into the system 30 and at the resident's premises as determined by the geolocation of their mobile device, for example. A further restriction may be that the system 30 conditions the electronic key's validity on access authorization provided directly from the resident, so a key may be provisioned but not active until a resident responds to an access request from the system 30 affirmatively. The system 30 may communicate to an access device such as a gate, door lock, drawer, safe or similar containment tool using various wireless methods including, but not limited to, Bluetooth, NFC, RFID, Wi-Fi, IR and Zigbee, for example.

Referring to FIGS. 22-25, an example implementation of a database architecture 500 for the system 30 which may be used for implementation of the Site and Place hierarchy, as well as process flow diagrams 530, 540, and 550 related to the use of Locators with those Sites and Places to improve workflows, are now described. The database architecture 500 is a distributed document-oriented database arrangement, which is synchronized between the operations management server(s) 31 and a plurality of different communications devices 32a-32n, such as mobile or smart phones, tablets, laptop computers, etc., as noted above. Database documents separately represent different elements of the system, which may include the following:

User: A person or software client capable of logging into the system. Users may be allowed access to one or more locations (Sites).

Site: A hierarchy of Places. Places within a Site have parents "above" them, children "below" them, and siblings "around" them. For example, Buildings (parent) have one or more Units (children of the Building, siblings of each other), Units (parent) have one or more Rooms (children of the Unit, siblings of each other), etc. Sites may have a Location Root that represents the ID (database document key) of the Place above which no additional Places exist in the hierarchy (no parent Place).

Place: A Place represents something that may be "located" within a Site. The following are examples (not an exhaustive list) of sample Places: Phase, Building, Wing, Floor, Unit, Room, Bed, etc. Additional examples include "Amenities" for a Site: Pool, Fitness Center, Game Room, Volleyball Court, etc. Places may be located using a combination of one or more Locators associated with a Place: the Site hierarchy itself (a Floor Place may be located using its parent Building Place), geolocation (GPS), scanned identifiers (bar or QR codes, Near Field Communications), beacons, etc. Places may be categorized using a Type and Detail, and each Type/Detail combination may prescribe specialized attributes within the Place document (e.g., Unit/Residential is a categorization, and the Unit/Residential categorization prescribes Access Method and Access Restriction attributes).

Project: An ordered collection of one or more Tasks (a.k.a., Task Series).

Task: A Task represents a piece of work to be done or a resident issue to be resolved. All Tasks have a location, even if it is just identification of a Site. The location may also be a combination of a geolocation and a Place (e.g., a specific point within a Building).

The database architecture 500 may further include definitions of additional documents related to Organizations, Subscriptions and Billing, and Audit Trails, although they are not discussed further in the examples presented below.

Synchronization of the documents between the operations management server(s) 31 and the communication devices 32a-32n facilitates "offline access" for the system 30. Communication devices 32a-32n may not have an active connection to the operation management servers 31 (e.g., there may be no WiFi or wireless signal), and yet a User may be able to create, read, update, and even delete documents within the database architecture 500. Changed documents are synchronized to the operations management server(s) 31 as soon as an active connection is restored. At that point changes are synchronized with other communication devices 32a-32n that make up the full system. In this way, synchronization of the distributed database architecture 500 between communication devices 32a-32n occurs through the operations management server(s) 31.

Individual communications devices 32a-32n do not necessarily maintain copies of all documents in the system 30. Security context may allow individual Users access to one or more Sites, and a given communication device 32a-32n maintains a "login" context for an individual User. In an example configuration, only documents related to that User's Sites are synchronized to a given communication device 32a-32n.

Figure 22:
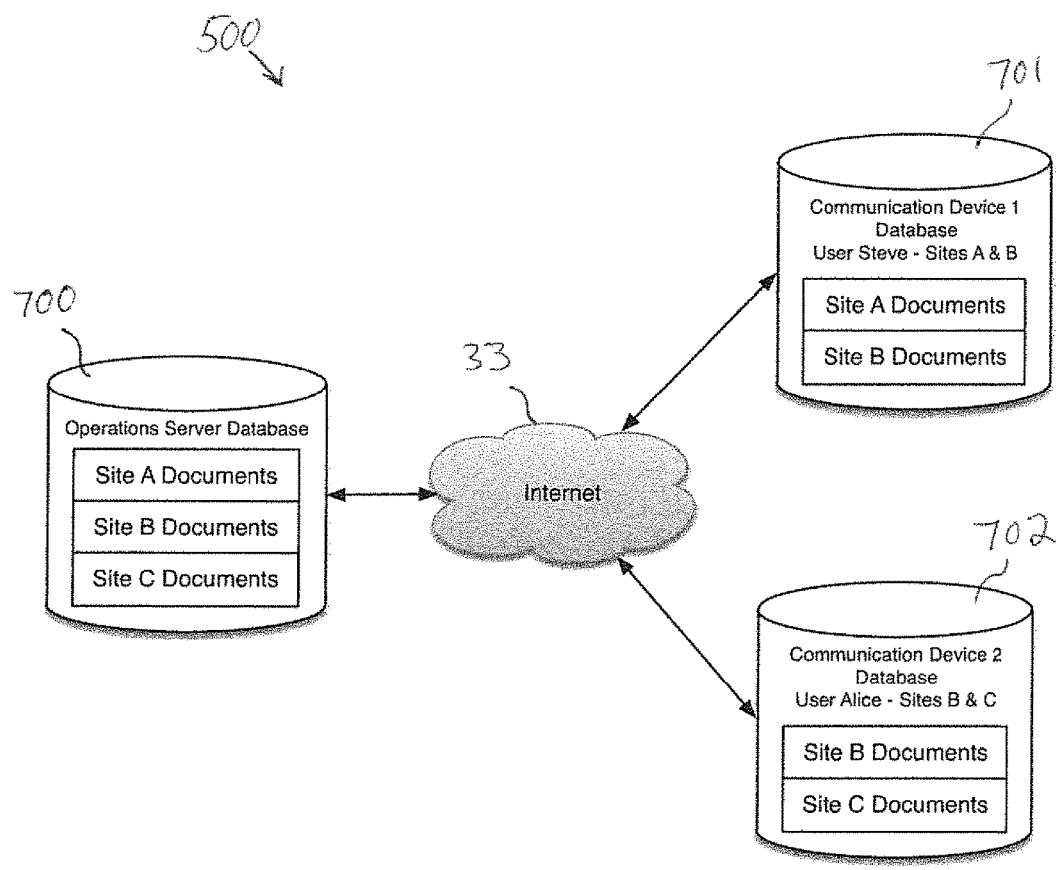
FIG. 22 is a distributed database architecture diagram which may be used with the system of FIG. 1.
Figure 23:
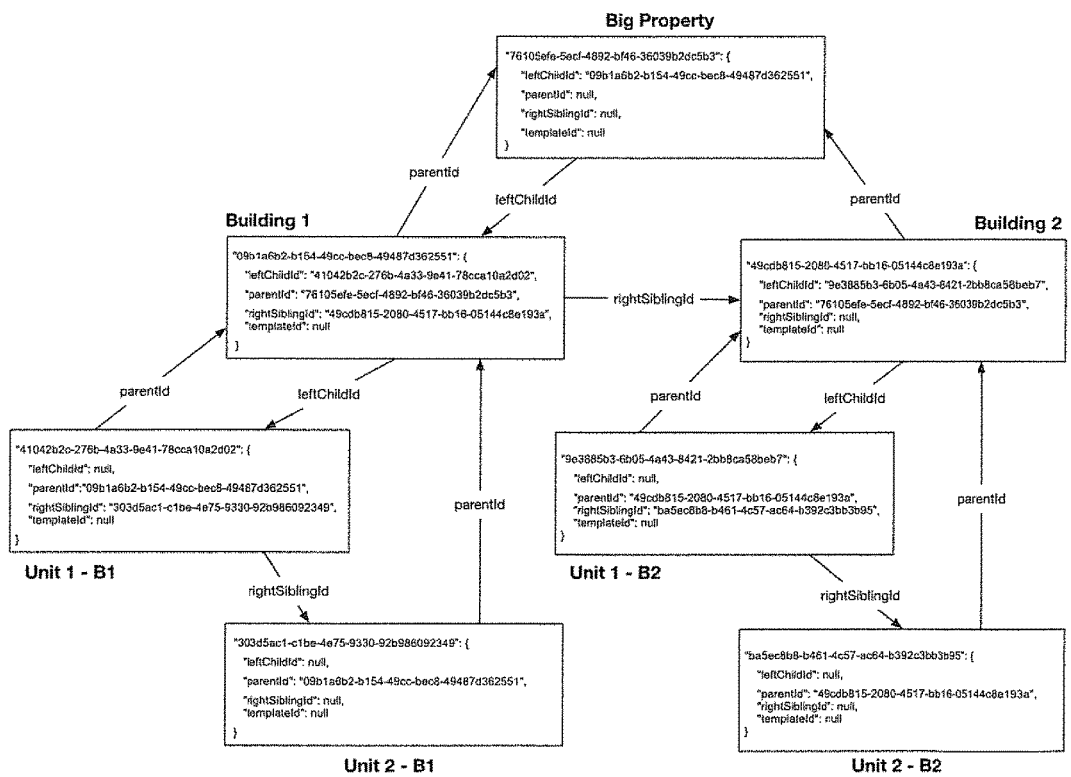
FIGS. 23-25 are flow diagrams illustrating hierarchical building location database search operations that may be used within the architecture of FIG. 22.

As seen in FIG. 22, the operations management server(s) 31 illustratively hosts a database 700 that contains all documents for all Sites. There are two communications device databases 701, 702 in communications with the operations management server database 700 in the illustrated example, with two different users logged into the system via the respective user devices. User Steve is logged into the communication device associated with the database 701 and is allowed access to Site A and Site B, and thus only synchronization of documents for Site A and Site B to the operations management server 31 occurs (e.g., Places, Assets, Tasks associated with Site A and Site B). User Alice is logged into the communication device associated the with the database 702 2 and is allowed access to Site B and Site C, and thus only synchronization of documents for Site B and Site C to the operations management server 31 occurs. Changes made by User Alice at the database 702 may first synchronize with the operations management server 31 before those changes will synchronize to User Steve at the database 701.

Synchronization may occur at the document level, with each document having both a unique identifier (the document key) and a unique revision. The revision may include two components: an always increasing revision count along with universally unique identifier, e.g., "4-5f54592627bb2463b6e1500ef255b227". In this example, the 4 represents the always increasing revision count (the document was created and then changed 3 times). The synchronization process ensures that copies of the database are efficiently kept up to date with the latest version of individual documents. In the case of a revision conflict, an algorithm (which may be based on the revision's unique identifier) may be used to ensure a predictable "winner" between the conflicting document revisions.

The Site is a hierarchy of Places. In the database architecture 500, there may be a Site document that captures the relationships between the Places of a Site. Consider FIG. 23, which represents a Site that has a single "Big Property" with two Buildings (Buildings 1 and 2), each of which has two Units (Unit 1—B1 and Unit 2—B1; Unit 1—B2 and Unit 2—B2). The hierarchy is visually represented, and it includes example data structures that represent the specific Place relationship nodes. By way of example, the Site hierarchy may be represented as a left-child, right-sibling binary tree augmented with parent pointers, although other suitable hierarchies may also be used, as will be appreciated by those skilled in the art. The Location Root for this hierarchy is the document with key "76105efe-5ecf-4892-bf46-36039b2dc5b3". An example Site document stored in the database 700 for the hierarchy above is set forth below, in which the Location Root may be found in the "rootId" key:

```
{
    "_id": "9cec4008-b9a4-45bb-b95b-c634db121401",
    "_rev": "8-bf0dc2f4cc601f0ede63e261e501de18",
    "type": "site",
    "rootId": "76105efe-5ecf-4892-bf46-36039b2dc5b3",
    "places": {
        "09b1a6b2-b154-49cc-bec8-49487d362551": {
            "leftChildId": "41042b2c-276b-4a33-9e41-78cca10a2d02",
            "parentId": "76105efe-5ecf-4892-bf46-36039b2dc5b3",
            "rightSiblingId": "49cdb815-2080-4517-bb16-
```

```
05144c8e193a",
      "templateId": null
    },
    "303d5ac1-c1be-4e75-9330-92b986092349": {
      "leftChildId": null,
      "parentId": "09b1a6b2-b154-49cc-bec8-49487d362551",
      "rightSiblingId": null,
      "templateId": null
    },
    "41042b2c-276b-4a33-9e41-78cca10a2d02": {
      "leftChildId": null,
      "parentId": "09b1a6b2-b154-49cc-bec8-49487d362551",
      "rightSiblingId": "303d5ac1-c1be-4e75-9330-
92b986092349",
      "templateId": null
    },
    "49cdb815-2080-4517-bb16-05144c8e193a": {
      "leftChildId": "9e3885b3-6b05-4a43-8421-
2bb8ca58beb7",
      "parentId": "76105efe-5ecf-4892-bf46-36039b2dc5b3",
      "rightSiblingId": null,
      "templateId": null
    },
    "76105efe-5ecf-4892-bf46-36039b2dc5b3": {
      "leftChildId": "09b1a6b2-b154-49cc-bec8-
49487d362551",
      "parentId": null,
      "rightSiblingId": null,
      "templateId": null
    },
    "9e3885b3-6b05-4a43-8421-2bb8ca58beb7": {
      "leftChildId": null,
      "parentId": "49cdb815-2080-4517-bb16-05144c8e193a",
      "rightSiblingId": "ba5ec8b8-b461-4c57-ac64-
b392c3bb3b95",
      "templateId": null
    },
    "ba5ec8b8-b461-4c57-ac64-b392c3bb3b95": {
      "leftChildId": null,
      "parentId": "49cdb815-2080-4517-bb16-05144c8e193a",
      "rightSiblingId": null,
      "templateId": null
    }
  }
}
```

Each Place in the Site hierarchy may be associated with or maintain a parentId (the parent of the Place), leftChildId (the leftmost child of that Place), a rightSiblingId (the Place's sibling immediately to its right), and a templateId, as will be discussed further below. Projects, Tasks, and other documents that are to reference a Place may record only the key of the specific Place of interest, and that Place of interest implicitly establishes a broader context for metrics, etc. For example, the Task document for "Unit 1—B2" would store only the Place id for "Unit 1—B2". The full Site context for the Task is then implicitly established from "Unit 1—B2"'s position in the Site hierarchy. The Task for "Unit 1—B2" is a task for "Building 2" as much as it is a task for "Big Property".

Places for the hierarchy may be stored in individual documents using the keys from the Site document. For example, Building 1 may use the key "09b1a6b2-b154-49cc-bec8-49487d362551" in the Site places hash above, and the Place document may use the same key in the database 700. The Building 1 Place document may be as follows:

```
{
  "_id": "09b1a6b2-b154-49cc-bec8-49487d362551",
  "_rev": "5-8c9f6507b4d1d27591235841c8d37d92",
  "type": "place",
  "placeType": "placetype-building",
  "placeTypeDetail": "placetype-building-placetypedetail-
commercial",
  "siteId": "9cec4008-b9a4-45bb-b95b-c634db121401",
  "childCount": 2,
  "details": {
    "level": false,
    "name": "Building 1",
    "shortName": "B1",
    "geoJSON": {
      "geometry": {
        "coordinates": [
          [
            [
              -81.34290888905525,
              28.551268145524503
            ],
            [
              -81.34291157126427,
              28.551367098529706
            ],
            [
              -81.34264066815376,
              28.55137534460928
            ],
            [
              -81.34264066815376,
              28.551265789499414
            ],
            [
              -81.34290888905525,
              28.551268145524503
            ]
          ]
        ],
        "type": "Polygon"
      },
      "properties": {
        "name": "Building 1",
        "placeId": "09b1a6b2-b154-49cc-bec8-49487d362551",
        "placeType": "placetype-building"
      },
      "type": "Feature"
    }
  },
  "relations": {
    "leftChildId": "41042b2c-276b-4a33-9e41-78cca10a2d02",
    "parentId": "76105efe-5ecf-4892-bf46-36039b2dc5b3",
    "rightSiblingId": "49cdb815-2080-4517-bb16-
05144c8e193a",
    "templateId": null
  }
}
```

The primary attributes on a Place document (aside from the ID, revision, and type) may include the following:

placeType/placeTypeDetail—This is the categorization described above. The combination (in this case identifying Building 1 as a Commercial Building) define both the detail attributes, but also constrain the types of placeTypes that may be nested under this Place in the hierarchy (e.g., a Floor may be a child of a Building, but not a Room).

details—This is an attribute hash, with the attributes set depending on the placeType and placeTypeDetail combination. In addition, the hash may include one or more Locators. In the example Place document above, there is a single Locator, which is a GeoJSON (geolocation), The full set of details for a Place is impacted by the template pointers defined in the relations field, as discussed further below.

siteId—The siteId contains a pointer back to this Place's Site document.

relations—The relations attribute includes details about the Place's location in the Site hierarchy. While this information is stored within the Site document, it is duplicated within the Place for redundancy and convenience.

Places may act as templates for other Places, and this relationship may chain.

Various traversals of the Site hierarchy are possible, such as the following (this is not an exhaustive list of possible traversals):

Parent—Walking the parentId chain from a Place to the Site Location Root yields the chain described above. Pseudocode for the this traversal may be as follows:

```
define get_parent_chain ( starting_place )
    parent_chain = new empty array
    current_place = starting_place
    while current_place != null
        add current_place to end of parent_chain
        current_place = fetch current_place-
        >parentId
    end
    return parent_chain
end
```

Applying the above code to Building 2's second unit in the present example would yield the parent chain [<Unit 2—B2>, <Building 2>, <Big Property>].

Subtree—Given a particular place, a recursive depth or breadth first traversal of the tree can be made. The subtree traversal represents the full definition of a Place. Pseudocode for a depth-first traversal:

```
define gather_subtree ( starting_place, tree_nodes )
    current_place = starting_place
    while current_place != null
        add current_place to end of tree_nodes
        if current_place->leftChildId != null
            fetch current_place->leftChildId
            gather_subtree ( leftChild, tree_nodes)
        end
        current_place = fetch current_place-
        >rightSiblingId
    end
    return tree_nodes
end
define get_subtree ( starting_place )
    subtree_places = gather_subtree ( starting_place,
[ ] )
    return subtree_places
end
```

Applying the get_subtree code to Building 1 would yield the array [<Building 1>, <Unit 1—B1>, <Unit 2—B1>].

Children—Given a particular Place, the children may be found by walking the leftChildId and rightSiblingId chains without recursion. Pseudocode for gathering the children:

```
define get_children ( starting_place )
    child_ places = new empty array
    current_place = fetch starting_place-
    >leftChildId
    while current_place
        add current_place to end of child_places
        current_place = fetch current_place-
        >rightSiblingId
    end
    return child_places
end
```

Applying the get_children code to Building 2 would yield the array [<Unit 1—B2>, <Unit 2—B2>].

The traversals above may be used for many things within the operations management system 30, including (but not limited to) visual selection of places while creating work tasks and dynamic on-demand aggregation of a variety of statistics, as noted above. For example, while typical operations management may call for summarization of "In-Progress Work-Orders" at the Site level, the above traversals may be used to efficiently calculate (on demand), in-progress work-order counts for any arbitrary Place or Place traversal (not easily done in paper-based systems). In-progress work-order counts may be generated for an entire property or for individual phases, buildings, floors, or units through simple UI selectors.

This functionality may be implemented through the combination of the output from the above traversals with Project and Task queries against the database. Consider the example above (calculating the number of in-progress work-orders for an arbitrary Place). Pseudocode for the operation may be as follows:

```
define get_inprogress_workorder_count ( place )
    place_subtree = get_subtree ( place )
    count = select count from tasks where task.place in
place_subtree
    return count
end
```

This pseudocode leverages the subtree traversal to ensure that all children, and all children of children, are included in the count of in-progress tasks for a particular place. While this pseudocode leverages the subtree traversal, it could have just as easily leveraged the children traversal for a different set of results:

```
define get_inprogress_child_workorder_count ( place )
    place_subtree = get_children ( place )
    count = select count tasks where task->place in
place_subtree
    return count
end
```

With this one change, the result of the call yields the count of all open work orders associated with just the children of a particular place (for example, we could see the counts of just the buildings in the "Big Property" of our example).

Each place may be identified by a placeType and placeTypeDetail. The structure for a placeType document may be as follows:

```
{
    "_attachments": {
        "icon.png": {
            "content_type": "image/png",
            "digest": "sha1-hsdfDrVIp8VNZPIbyvi25+R7Z9s=",
            "length": 529,
            "revpos": 3,
            "stub": true
        }
    },
    "_id": "placetype-property",
    "_rev": "3-93895c28ff10bf18ea6d5ba27c83d750",
    "legalChildTypes": [
        "placetype-phase",
        "placetype-building",
        "placetype-amenity"
    ],
```

```
"legalWorkTypes": ["worktype-all"],
"displayIndex": 0,
"displayNames": {
    "en": "Property"
},
"type": "place-type",
"typeID": "placetype-property"
}
```

The placeType definitions, among other things, may include a "legalChildTypes" attribute, which lists all of the placeTypes that can be nested under this placeType in the hierarchy. For example, in this case, Properties may only have Phases, Buildings, and Amenities as direct children in the Site hierarchy.

A description of Place templating is now provided with reference to an example Site with 20 buildings. Each building has 2 floors, and each floor has 4 units. Templating allows a User to mark a subtree in the Site hierarchy as a pattern—a template—for additional instances of that Place. For example, a User may create the first building Place, give it two Places as children (the floors), and give each of those floor Places four children (the units). The User would then indicate to the system that the building Place (the "root" of the building subtree) is really a template for additional buildings with 2 floors and 4 units. They may then quickly create instances of the templated building to setup the 19 other buildings in the Site.

Places may act as templates for other Places, and this relationship may chain (an instance of a template may be used within another templated hierarchy). The template is implemented as a templateId key within the relationship structures, but it is separate from the parent child relationships. Templating accelerates Site hierarchy creation, conserves database space, and allows for intuitive replication of Places within the Site hierarchy. Several operations may be relevant to templating, such as: reading attribute sets, creation of instances, and editing instances/templates (including breaking the attribute chain).

Templates may impact the collection and modification of Place detail hashes. If a templateId exists and is non-null for a Place, then the full attribute set for a Place may be formed through a recursive merge of all the detail hashes in the template chain. For the pseudocode below, a hash represents an unordered set of key value pairs. Merging two hashes results in the union of the two sets, with one of the hashes having priority when there are conflicting keys in the union. For example, imagine two hashes: HashA={'Key1'=>'Value1', 'Key2'=>'Value21' } and HashB={'Key2'=>'Value22', 'Key3'=>'Value3'}. The function HashA.merge(HashB) would yield {'Key1'=>'Value1', 'Key2'=>'Value22', 'Key3'=>'Value3'}. In other words, when HashB was merged into HashA, HashB's key-value pairs took priority in the conflict of 'Key2'. With the definition of hash and hash merge set, the following pseudocode shows how templates may be used with a Place to fetch the full attribute set for a Place:

```
define get_all_attributes ( place )
    template_attr = { }
    if place->templateId != null
        template_place = fetch place->templateId
        template_attr = get_all_attributes (
    template_place )
    end
    return template_attr.merge ( place.details )
end
```

This is a recursive function that will walk to the last template, and then merge the returned Place details (effectively allowing details of templates "closer" to the Place to override details of templates "further" from the Place in the template chain).

Figure 24:
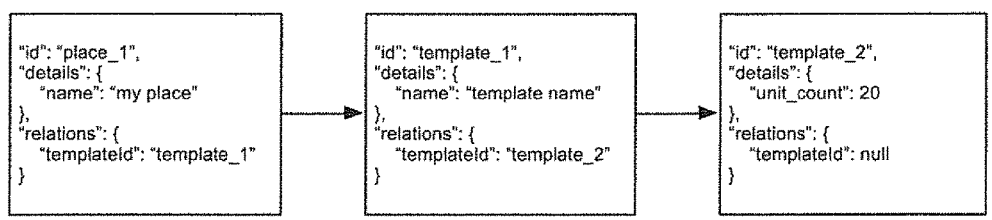
Figure 25:
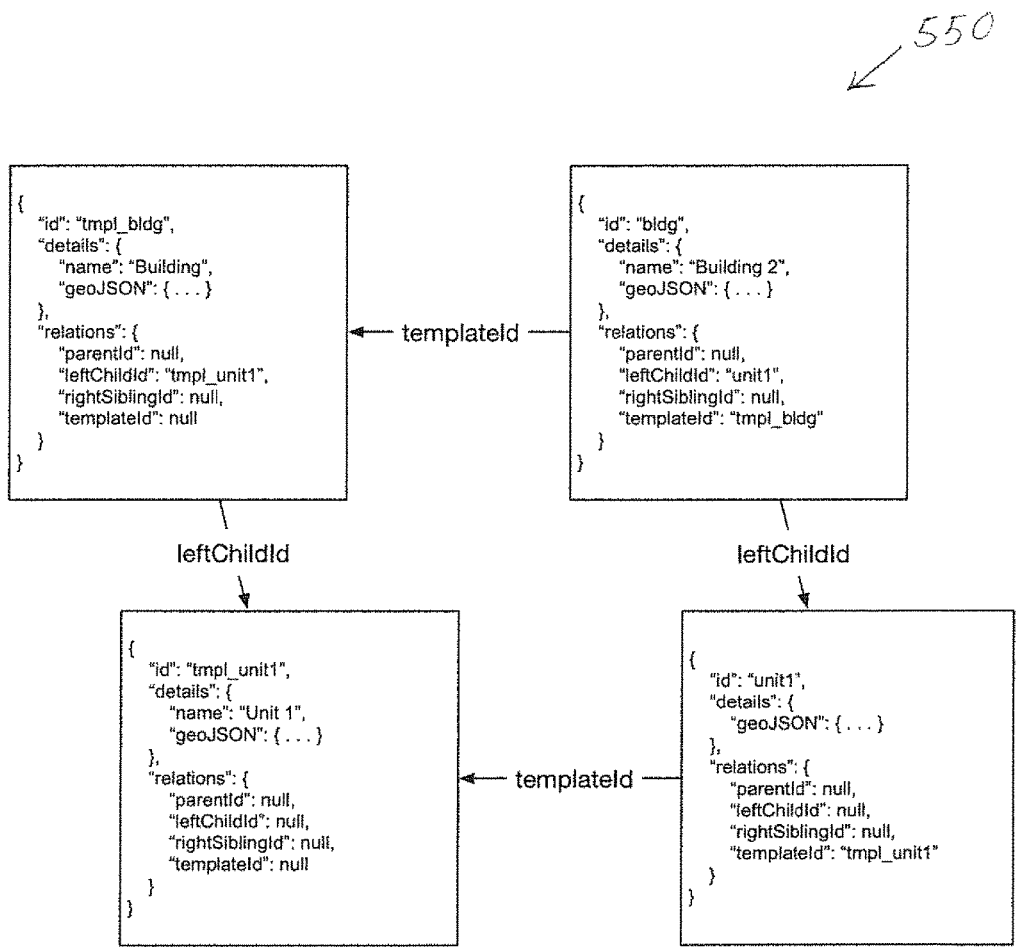

As an example, consider three Places in the template chain flow 540 of FIG. 24. Applying the pseudocode to "place_1" (get_all_attributes(<place_1>)) would yield the following attribute set:

```
{
    "name": "my place",
    "unit_count": 20
}
```

As noted above, this is a union of all key-value pairs in the chain, with Places "closer" to the original Place overriding those "further" away in a conflict. In this case, the "name" attribute in "place_1" is a conflict with the "name" attribute in "template_1", and therefore the "name" in "place_1" takes precedence.

Once a template has been created, instances of that may can be created. Instance creation involves duplicating the hierarchy of the template while setting the templateId of each duplicate to point to the original. For example, the "instance" of a building template with two units would appear as in the chain flow 550 of FIG. 25 after creation. The two Places on the right are the instances of the templated building. Distinct Places with distinct IDs are duplicated from the template subtree, with each duplicate getting a templateId that points back to its mate in the template subtree. Example pseudocode for creating the instance of a template may be follows:

```
define template_instance ( template, parent )
    current_template = template
    while template != null
        new_place = create new place with *empty* details hash
        new_place->templateId = current_template
        add new_place as last child of parent
        if current_template->leftChildId != null
            template_child = fetch current_template->leftChildId
            template_instance ( template_child, new_place
        )
        end
        current_template = fetch current_template->rightSiblingId
    end
end
```

Once template_instance is executed, the detail attribute hash may be filled in with attributes that override the template. For example, in the example above "Building 2" has a "name" detail that overrides the templates "name" detail. The "name" detail "Building 2" is set after the template_instance code is run and the template hierarchy has been duplicated.

As discussed above, the template chain may help ensure that the full attribute set for a Place is a recursive merge of all templates in the chain. In an example implementation, for a Place to use an attribute from the template chain, the Place does not have the attribute key-value pair in its detail hash. If it does have the key-value pair, it takes priority over any similarly named keys in the template chain. The addition of a key to a Place effectively "breaks" the template chain for that attribute, and changes to template attributes no longer affect the detail set for that Place. The User interface may capitalize on this by forcing the user to acknowledge the override when adding a new attribute to Place details when that Place has a non-null templateId.

As noted above, Places in the subtree of a template are duplicated and linked to their corresponding template places. That means that the addition or removal of a child Place to a template are not automatically reflected as adding or removing child places from a template. Addition of a child Place to a template may cause a duplicate of the new child to be added (appropriately templated) to other instances of the template.

```
define add_child_template_to_instances ( template )
    parent_template_id = template->parentId
    select from places where place->templateId ==
  parent_template_id
    for each selected_place
        new_place = create new place with *empty* details
  hash
        new_place->templateId = template->id
        add new_place as child of selected_place
    end
end
```

Removal of a templated Place may cause, with permission from the User, all instances of that template to be deleted.

```
define template_delete ( template )
    select from places where place->templateId ==
  template.id
        delete selected_place
    end
```

These additional behaviors on Add/Remove of a templated Place may help ensure bulk edits by the User work as expected.

A Locator represents a method of identifying a Place. Each Place has zero or more Locators associated with it. If there are no Locators, then a Place may be located through its parent or through context. Examples of Locators include, but are not limited to:

Geolocation—Currently represented as a GeoJSON structure that "fences" the Place. For example, a geographic center point and radius line may be specified to set a circular fence. Alternately, a polygon with an arbitrary number of vertices may be specified to fence the Place. In this way User's may "draw" the fence around a Place. The GeoJSON locators are maintained within the database as a spatial index.

Beacon (iBeacon)—A device using Bluetooth Low Energy (BLE) proximity sensing to transmit a universally unique identifier that can be picked up by a communication device. An approximate distance to the beacon may be established. Places may be associated with the unique identifier of a beacon (the beacon broadcasts its own QUID, which will not match the ID or key of the Place document, so there is a mapping through a database index).

Quick Response Code (QR Code)—A matrix barcode that can be scanned by a communication device. Places can be labeled with QR Codes representing a universally unique identifier. The QR Code unique identifier will not match the ID or key of the Place document, so there is a mapping through a database index.

Near Field Communications (NFC)—Places may be equipped with NFC tags, which much like a beacon, can be detected by an NFC sensor of a communication device. In addition, NFC allows for secure transmission of additional data that may provide additional context in the detection of places. NFC tag identifiers may not necessarily match the ID or key of the Place document, so there may be a mapping through a database index.

Data supporting specific Locators may be added directly to the details hash of a Place. In the example above, the Place for "Building 1" (key: "09b1a6b2-b154-49cc-bec8-49487d362551") has a single geolocation Locator, which happens to be the GeoJSON for a 4 sided polygon boxing off the building. Locators for beacons are named "iBeacon" and have nothing but a unique identifier.

During Task Creation on a communication device, the User may associate a Task with a Place. As Task creation is initiated by a user, his or her communication device is queried for GPS location, nearby beacons, and NFC tags, for example. The User may also be provided with the option to take pictures or video, record audio, or scan a QR code. The end result is that upon entering Place selection during Task Creation the operations management system has one or more Locators. These Locators are individually compared to the their Locator database indices to build a set of suggested Places sorted, e.g., according to distance from the communication device (although it should be noted that distance need not be the only input considered, as other factors such as how recent a place was selected and how frequently it is chosen by that distinct user may also be used in some embodiments).

```
define get_suggested_places
    candidate_places = [ ]
    current_location = current GPS location, if available
    if current_location available
        select from places where place.geoJSON < 150ft of
  current_location
            add each selected_place to candidate_places
        end
    query for all nearby bluetooth low energy beacons
    if nearby BLE beacons
        select from places where place.beacon in nearby
  beacon identifiers
            add each selected_place to candidate_places
        end
    query for all nearby near field communication tags
    if nearby NFC tags
        select from places where place.nfc in nearby NFC
  tag identifiers
            add each selected_place to candidate_places
        end
    allow user to scan QR code
    if QR code
        select from places where place.qrcode in scanned
  qr code
            add each selected_place to candidate_places
        end
    sort candidate_places in ascending order by Place
  distance
        return sorted candidate_places (closest first)
    end
```

The sorting distance between a Place and GeoJSON is defined as the distance from the current GPS location to that Place's GeoJSON (minimum distance from the GPS location—a point—and each of the line segments in the polygon). The distance to a beacon is provided by the communication device. The distance to an NFC device is typically on the order of several centimeters. The distance to a QR code is considered to be 0. In other words, practically speaking, QR codes will be returned first, NFC devices next, and then beacons and GeoJSON in actual distance order, for example.

Once the suggested places array is gathered and sorted, the User is offered a chance to confirm a Place selection. This selection, once made, is then bound to the Task (the Task's "place" attribute is set to the ID or key of the Place). Because Place's have a placeType and placeTypeDetail, context for the newly created Task is partially established. Tasks themselves have a workType and workTypeDetail, and the workTypes that may be set on a Task associated with Place of placeType/placeTypeDetail may be constrained. For example, if a placeType/placeTypeDetail indicates a Place is "Commercial", then it may preclude workType/workTypeDetail combinations that are Residential. This is implemented through the "legalWorkTypes" attribute on the placeType, as discussed above.

This constraint allows the server 31 to guide users through task creation where there are thousands of permutations of Places, placeType, and workType, and not all are legal combinations for operations maintenance. The end result is a marked improvement in the speed with which maintenance requests can be created.

Locators are used to optimize Task assignments and work order. Communication devices track both GeoJSON fences and beacons. As fences are entered or beacons passed, the given communication device 32a-32n notifies the operations management software of changes in the position of the communication device. In this way a User's "real time" location is tracked while on maintenance properties.

As with Task Creation, changes in position allow the operations management server 31 to create a suggested list of nearby tasks. Combined with the urgency of tasks and the skillset of a User, a User's Task list may be reprioritized on the fly in order to optimize the work that they perform. Suitable prioritization algorithms may use Locators to determine nearby actionable tasks, as discussed above with respect to Task creation.

Task Completion may use Locators for verification of Task completion. Tasks may require different types of verification, sometimes in sequence. In fact, each Task has an ordered array of completionSteps, and each completionStep has its own "type". The completion step types include: Checkmark, Signature, Photo, Note, Audio, Video, QR code, GeoJSON, Beacon, and NFC. The first seven (Checkmark through QRCode) are considered "unverified" completion steps. The last three (GeoJSON, Beacon, NFC) are considered "verified" completion steps (the User may be required to be physically present at the time of completion). It should be noted that each of the Verified completion step types may be Locators, to help ensure the User is associated with a Place at the time they indicate they have completed a Task.

As an example, consider the following. A user creates a work-order Task that is associated with a resident's AC closet (the Place is the AC closet). A QR Code has been placed behind the air filter of the air conditioner. Effectively the "AC Closet" Place will have two Locators: a QR Code and a GeoJSON fence around the closet. At the time of Task creation the AC Closet was associated with the Task, and the maintenance supervisor indicated that the Task could be completed through three completionSteps: Signature, QR Code, and GeoJSON. This means that to close the Task a maintenance worker would need to sign off using his finger on his communication device (e.g., a Signature on his smart phone), scan the QR Code behind the air filter, and be within or just outside of the GeoJSON fence (GPS location using the phone).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An operations management system for a site location having a plurality of real property fixtures distributed within the site location, the operations management system comprising:

at least one mobile communications device configured to receive pending work orders to be completed for the real property fixtures, said at least one mobile communications device comprising at least one real property fixture identifier sensor;

a plurality of real property fixture identifier devices adjacent respective ones of the plurality of real property fixtures and having a unique real property fixture identifier associated therewith;

a plurality of geolocation determining devices associated with respective one of the plurality of real property fixtures and configured to wirelessly sense proximity of said at least one mobile communications device; and an operations management server configured to store at least one database comprising a hierarchy of places within the site location, respective places associated with the plurality of real property fixtures within the site location, and pending work orders for respective real property fixtures and respective priority indicators associated therewith, determine a respective place associated with a given asset having a pending work order associated with the given real property fixture based upon the at least one database, determine a parent place within the site location within which the place associated with the given real property fixture resides based upon the at least one database, determine at least one sibling place within the parent place based upon the at least one database, determine pending work orders for other real property fixtures within the place associated with the given real property fixture and within the at least one sibling place, determine a relative priority of the determined work orders within the place associated with the given real property fixture and within the at least one sibling place based upon their respective priority indicators, and communicate the determined work orders to said at least one mobile communications device for completion in order of their relative priority, dynamically reorder the communicated work orders in response to a real-time change in geographic position of said at least one mobile communications device, the real-time change in geographic position being determined based upon communication between said at least one mobile communications device and the plurality of geolocation determining devices, and cooperate with said at least one mobile communications device to close pending work orders upon completion thereof in their order of relative priority by,
verifying completion of the pending work orders by at least,
determining that the unique real property fixture identifier matches a stored unique real property fixture identifier in the at least one database associated with the given real property fixture based upon the at least one real property fixture identifier sensor, and
determining that the at least one mobile communications device is within a threshold geographic area associated with a given geolocation determining device associated with the given real property fixture,
in response to verifying completion of the pending work orders, enabling a previously disabled graphical user interface element displayed on a display of said at least one mobile communications device to enable receiving of an indication of closure of the pending work orders via the graphical user interface element, and
receiving the indication of closure of the pending work orders via the graphical user interface element.

2. The operations management system of claim 1 wherein said operations management server is further configured to perform a parent traversal operation to determine successive parent places within the hierarchy terminating at the site location, and perform a subtree traversal operation to determine place subtrees beneath the site location; and wherein determining the pending work orders further comprises determining pending work orders for other real property fixtures within the determined place subtrees.

3. The operations management system of claim 1 wherein the at least one real property fixture identifier sensor comprises at least one of a WiFi transceiver, a Bluetooth transceiver, a radio frequency identification (RFID) device, a near field communication (NFC) device, and a quick response (QR) code reader.

4. The operations management system of claim 1 wherein the real property fixtures have respective asset types associated therewith; wherein each real property fixtures type has respective tasks to be completed in a sequential order for work orders associated therewith; and wherein said operations management server is configured to cooperate with said at least one mobile communications device to close pending work orders upon completion of the tasks associated with the respective real property fixtures type in their sequential order.

5. The operations management system of claim 1 wherein the real property fixtures have respective real property fixture types associated therewith; and wherein said operations management server is further configured to provide a template to said at least one mobile communications device for closing the pending work orders that changes based upon the real property fixture type of the real property fixture associated with the work order.

6. An operations management server associated with a site location having a plurality of real property fixtures distributed within the site location, the operations management server comprising:
a memory and a processor cooperating therewith to store at least one database comprising a hierarchy of places within the site location, respective places associated with the plurality of real property fixtures within the site location, and pending work orders for respective real property fixtures and respective priority indicators associated therewith,
determine a respective place associated with a given real property fixture having a pending work order associated with the given real property fixtures based upon the at least one database,
determine a parent place within the site location within which the place associated with the given asset resides based upon the at least one database,
determine at least one sibling place within the parent place based upon the at least one database,
determine pending work orders for other real property fixtures within the place associated with the given real property fixture and within the at least one sibling place,
determine a relative priority of the determined work orders within the place associated with the given asset and within the at least one sibling place based upon their respective priority indicators, and communicate the determined work orders to at least one mobile communications device comprising at least one real property fixture identifier sensor for completion in order of their relative priority,
dynamically reorder the communicated work orders in response to a real-time change in geographic position of the at least one mobile communications device, the real-time change in geographic position being determined based upon communication between the at least one mobile communications device and a plurality of geolocation determining devices associated with a respective one of the plurality of real property fixtures and configured to wirelessly sense proximity of the at least one mobile communications device, and
cooperate with the at least one mobile communications device to close pending work orders upon completion thereof in their order of relative priority by,
verifying completion of the pending work orders by at least
determining that a unique real property fixture identifier associated with a respective one of a plurality of real property fixture identifier devices adjacent respective ones of the plurality of real property fixtures matches a stored unique real property fixture identifier in the at least one database associated with the given real property fixture based upon the at least one real property fixture identifier sensor, and
determining that the at least one mobile communications device is within a threshold geographic area associated with a given geolocation determining device associated with the given real property fixture,
in response to verifying completion of the pending work orders, enabling a previously disabled graphical user interface element displayed on a display of the at least one mobile communications device to enable receiving of an indication of closure of the pending work orders via the graphical user interface element, and
receiving the indication of closure of the pending work orders via the graphical user interface element.

7. The operations management server of claim 6 wherein said processor is further configured to perform a parent traversal operation to determine successive parent places within the hierarchy terminating at the site location, and perform a subtree traversal operation to determine place subtrees beneath the site location; and wherein said processor further determines pending work orders for other real property fixtures within the determined place subtrees.

8. The operations management server of claim 6 wherein the at least one real property fixture identifier sensor comprises at least one of a WiFi transceiver, a Bluetooth transceiver, a radio frequency identification (RFID) device, a near field communication (NFC) device, and a quick response (QR) code reader.

9. The operations management server of claim 6 wherein the real property fixtures have respective real property fixture types associated therewith; wherein each real property fixture type has respective tasks to be completed in a sequential order for work orders associated therewith; and wherein said processor is configured to cooperate with the at least one mobile communications device to close pending work orders upon completion of the tasks associated with the respective real property fixture type in their sequential order.

10. The operations management server of claim 6 wherein the real property fixtures have respective real property fixture types associated therewith; and wherein said operations management server is further configured to provide a template to the at least one mobile communications device for closing the pending work orders that changes based upon the real property fixture type of the real property fixture associated with the work order.

11. A method for operating an operations management server for a site location having a plurality of real property fixtures distributed within the site location, the method comprising:
storing at least one database at the operations management server comprising a hierarchy of places within the site location, respective places associated with the plurality of real property fixtures within the site location, and pending work orders for respective real property fixtures and respective priority indicators associated therewith;
determining a respective place associated with a given real property fixture having a pending work order associated with the given real property fixture based upon the at least one database;
determining a parent place within the site location within which the place associated with the given real property fixture resides based upon the at least one database;
determining at least one sibling place within the parent place based upon the at least one database;
determining pending work orders for other real property fixtures within the place associated with the given real property fixture and within the at least one sibling place;
determining a relative priority of the determined work orders within the place associated with the given real property fixture and within the at least one sibling place based upon their respective priority indicators, and communicate the determined work orders to at least one mobile communications device comprising at least one real property fixture identifier sensor for completion in order of their relative priority,
dynamically reordering the communicated work orders in response to a real-time change in geographic position of the at least one mobile communications device, the real-time change in geographic position being determined based upon communication between the at least one mobile communications device and the plurality of geolocation determining devices, and
cooperating with the at least one mobile communications device to close pending work orders upon completion thereof in their order of relative priority by
verifying completion of the pending work orders by at least
determining that a unique real property fixture identifier associated with a respective one of a plurality of real property fixture identifier devices adjacent respective ones of the plurality of real property fixtures matches a stored unique real property fixture identifier in the at least one database associated with the given real property fixture based upon the at least one real property fixture identifier sensor, and
determining that the at least one mobile communications device is within a threshold geographic area associated with a given geolocation determining device associated with the given real property fixture,
in response to verifying completion of the pending work orders, enabling a previously disabled graphical user interface element displayed on a display of the at least one mobile communications device to enable receiving of an indication of closure of the pending work orders via the graphical user interface element, and
receiving the indication of closure of the pending work orders via the graphical user interface element.

12. The method of claim 11 further comprising performing a parent traversal operation to determine successive parent places within the hierarchy terminating at the site location, and performing a subtree traversal operation to determine place subtrees beneath the site location; and wherein determining pending work orders further comprises determining pending work orders for other real property fixtures within the determined place subtrees.

13. The method of claim 11 wherein the real property fixtures have respective real property fixture types associated therewith; wherein each real property fixture type has respective tasks to be completed in a sequential order for work orders associated therewith; and wherein cooperating comprises cooperating with the at least one mobile communications device to close pending work orders upon completion of the tasks associated with the respective real property fixture type in their sequential order.

14. The method of claim 11 wherein the real property fixtures have respective real property fixture types associated therewith; and further comprising providing a template to the at least one mobile communications device for closing the pending work orders that changes based upon the real property fixture type of the real property fixture associated with the work order.

15. A non-transitory computer-readable medium having computer-executable instructions for causing a server to perform steps comprising:
storing at least one database comprising a hierarchy of places within a site location having a plurality of real property fixtures distributed within the site location, respective places associated with the plurality of real property fixtures within the site location, and pending work orders for respective real property fixtures and respective priority indicators associated therewith;
determining a respective place associated with a given real property fixture having a pending work order associated with the given real property fixture based upon the at least one database;

determining a parent place within the site location within which the place associated with the given real property fixture resides based upon the at least one database;

determining at least one sibling place within the parent place based upon the at least one database;

determining pending work orders for other real property fixtures within the place associated with the given real property fixture and within the at least one sibling place;

determining a relative priority of the determined work orders within the place associated with the given real property fixture and within the at least one sibling place based upon their respective priority indicators, and communicate the determined work orders to at least one mobile communications device comprising at least one property fixture identifier sensor for completion in order of their relative priority;

dynamically reordering the communicated work orders in response to a real-time change in geographic position of the at least one mobile communications device, the real-time change in geographic position being determined based upon communication between the at least one mobile communications device and the plurality of geolocation determining devices; and cooperating with the at least one mobile communications device to close pending work orders upon completion thereof in their order of relative priority by verifying completion of the pending work orders by at least determining that a unique real property fixture identifier associated with a respective one of a plurality of real property fixture identifier devices adjacent respective ones of the plurality of real property fixtures matches a stored unique real property fixture identifier in the at least one database associated with the given real property fixture based upon the at least one real property fixture identifier sensor, and determining that the at least one mobile communications device is within a threshold geographic area associated with a given geolocation determining device associated with the given real property fixture, in response to verifying completion of the pending work orders, enabling a previously disabled graphical user interface element displayed on a display of the at least one mobile communications device to enable receiving of an indication of closure of the pending work orders via the graphical user interface element, and receiving the indication of closure of the pending work orders via the graphical user interface element.

16. The non-transitory computer-readable medium of claim 15 further having computer-executable instructions for causing the server to perform a parent traversal operation to determine successive parent places within the hierarchy terminating at the site location, and perform a subtree traversal operation to determine place subtrees beneath the site location; and wherein determining pending work orders further comprises determining pending work orders for other real property fixtures within the determined place subtrees.

17. The non-transitory computer-readable medium of claim 15 wherein the real property fixtures have respective real property fixture types associated therewith; wherein each real property fixture type has respective tasks to be completed in a sequential order for work orders associated therewith; and wherein cooperating comprises cooperating with the at least one mobile communications device to close pending work orders upon completion of the tasks associated with the respective real property fixture type in their sequential order.

18. The non-transitory computer-readable medium of claim 15 wherein the real property fixtures have respective real property fixture types associated therewith; and further having computer-executable instructions for causing the server to provide a template to the at least one mobile communications device for closing the pending work orders that changes based upon the real property fixture type of the real property fixture associated with the work order.

\* \* \* \* \*

UNITED STATES PATENT AND TRADEMARK OFFICE
CERTIFICATE OF CORRECTION

PATENT NO. : 10,078,805 B2  
APPLICATION NO. : 14/488895  
DATED : September 18, 2018  
INVENTOR(S) : Joseph S. Westlake et al.

Page 1 of 1

It is certified that error appears in the above-identified patent and that said Letters Patent is hereby corrected as shown below:

On the Title Page

Item (72) Inventor:     Insert: -- DAN POLFER --

Signed and Sealed this  
Sixteenth Day of April, 2019

Andrei Iancu  
*Director of the United States Patent and Trademark Office*

UNITED STATES PATENT AND TRADEMARK OFFICE
CERTIFICATE OF CORRECTION

PATENT NO. : 10,078,805 B2
APPLICATION NO. : 14/488895
DATED : September 18, 2018
INVENTOR(S) : Joseph S. Westlake It is certified that error appears in the above-identified patent and that said Letters Patent is hereby corrected as shown below:

On the Title Page

Item (60), Delete the related U.S. Application:
"Provisional application No. 61/878,962, filed on Sep. 17, 2013."

And insert:
--Provisional application No. 61/878,692, filed on Sep. 17, 2013.--

Signed and Sealed this
Fifteenth Day of August, 2023

Katherine Kelly Vidal
*Director of the United States Patent and Trademark Office*